(12) United States Patent
Hashiguchi et al.

(10) Patent No.: US 8,238,437 B2
(45) Date of Patent: Aug. 7, 2012

(54) IMAGE ENCODING APPARATUS, IMAGE DECODING APPARATUS, AND CONTROL METHOD THEREFOR

(75) Inventors: Noriyasu Hashiguchi, Kawasaki (JP); Hisashi Ishikawa, Urayasu (JP); Kenta Hosaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 994 days.

(21) Appl. No.: 12/211,886

(22) Filed: Sep. 17, 2008

(65) Prior Publication Data
US 2009/0080531 A1    Mar. 26, 2009

(30) Foreign Application Priority Data

Sep. 20, 2007  (JP) ................................. 2007-244444
Nov. 20, 2007  (JP) ................................. 2007-300972

(51) Int. Cl.
*H04B 1/66* (2006.01)
(52) U.S. Cl. ................................. 375/240.24
(58) Field of Classification Search ........................ None
See application file for complete search history.

(56) References Cited

U.S. PATENT DOCUMENTS

| | | | | |
|---|---|---|---|---|
| 5,321,532 A | 6/1994 | Ishikawa et al. | ............. | 358/534 |
| 5,465,173 A | 11/1995 | Ishikawa et al. | ............. | 358/534 |
| 5,774,634 A | 6/1998 | Honma et al. | ................ | 395/109 |
| 5,903,360 A | 5/1999 | Honma et al. | ................ | 358/450 |
| 5,926,292 A | 7/1999 | Ishikawa et al. | ............. | 358/534 |
| 6,252,992 B1 | 6/2001 | Ishikawa | ........................ | 382/239 |
| 6,778,709 B1 * | 8/2004 | Taubman | ........................ | 382/240 |
| 2003/0123550 A1 * | 7/2003 | Wang et al. | ............... | 375/240.16 |
| 2004/0032968 A1 * | 2/2004 | Andrew et al. | ................ | 382/100 |
| 2007/0002948 A1 | 1/2007 | Shibahara et al. | ........ | 375/240.12 |
| 2008/0037883 A1 | 2/2008 | Tsutsumi et al. | .............. | 382/232 |
| 2008/0095455 A1 | 4/2008 | Hosaki | ........................... | 382/248 |

FOREIGN PATENT DOCUMENTS

| | | |
|---|---|---|
| JP | 01-240088 | 9/1989 |
| JP | 2-272972 | 11/1990 |
| JP | 9-37261 | 2/1997 |
| JP | 10257494 | 9/1998 |
| JP | 02936042 | 6/1999 |
| JP | 2000-253403 | 9/2000 |
| JP | 2002-300407 | 10/2002 |
| JP | 2004-253889 | 9/2004 |
| JP | 2005-57750 | 3/2005 |
| JP | 2006-80793 | 3/2006 |
| JP | 2006-80933 | 3/2006 |
| JP | 2006-246374 | 9/2006 |
| JP | 2007-116731 | 5/2007 |

* cited by examiner

*Primary Examiner* — David Pearson
(74) *Attorney, Agent, or Firm* — Fitzpatrick, Cella, Harper & Scinto

(57) ABSTRACT

This invention scans a block using a window having a size of p×q pixels, and encodes p×q sub-block data each formed from pixel data at relatively identical positions in windows. A blocking unit receives a 16×16-pixel block image. A sub-block division unit scans the received block for each 2×2-pixel window, and generates 2×2 sub-block data each having a size of 8×8 pixels. Each sub-block is formed from pixel data at relatively identical positions in windows. A variable length coding unit encodes each sub-block data. When the sum of encoded sub-block data exceeds an allowable encoded data amount, a sub-block elimination unit eliminates encoded sub-block data until the sum becomes equal to or smaller than the allowable encoded data amount. The sub-block elimination unit outputs the remaining encoded sub-block data as encoded data of a block of interest.

12 Claims, 23 Drawing Sheets

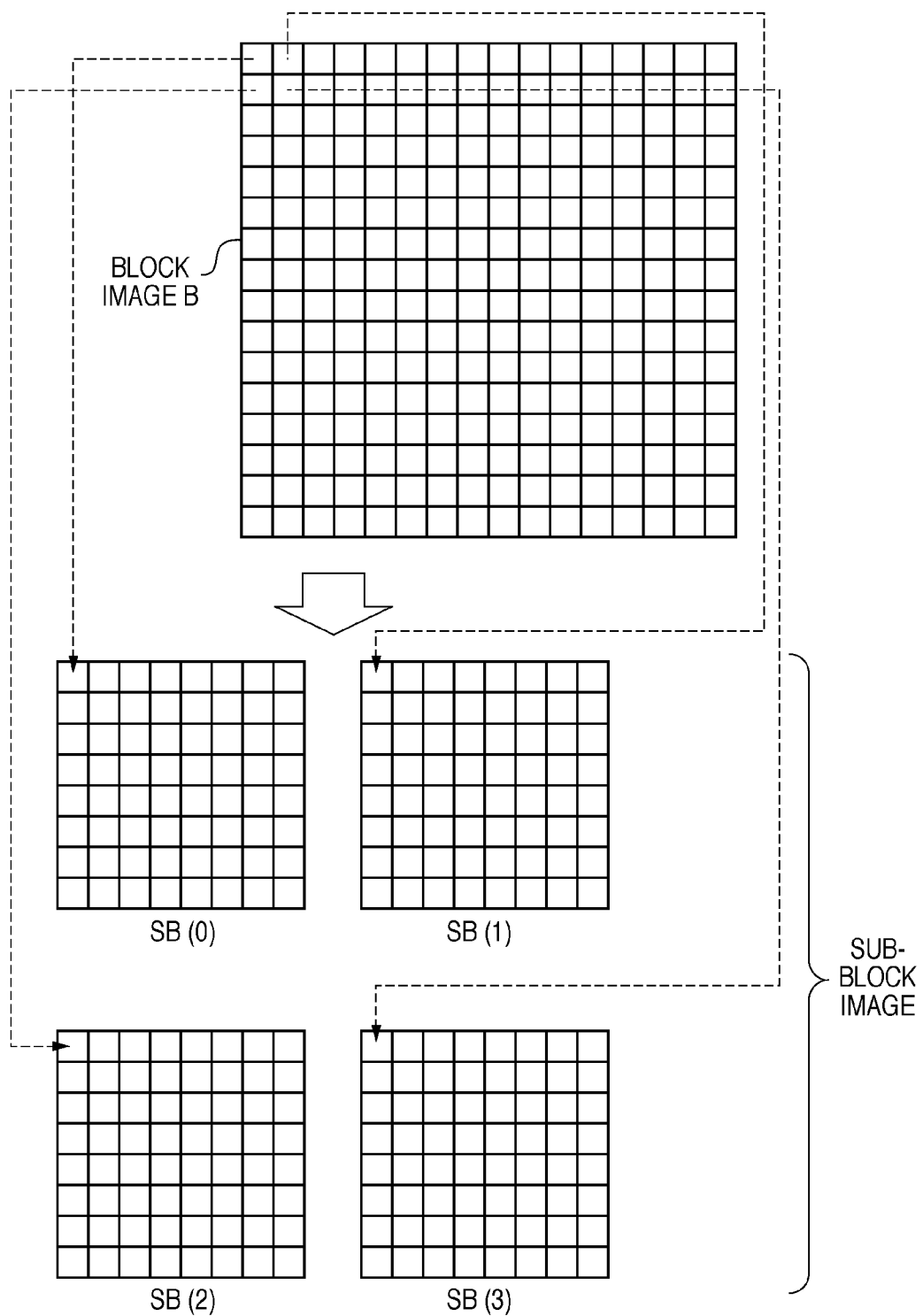

FIG. 12A

| 0 | 1 | 0 | 1 | 0 | 1 | 0 | 1 | 0 | 1 | 0 | 1 | 0 | 1 | 0 | 1 |
|---|---|---|---|---|---|---|---|---|---|---|---|---|---|---|---|
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |

FIG. 12B

| 0 | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|
| 0 | 0 | 0 | 0 | 0 | 0 | 0 | 0 | 1 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 | 1 |
| 2 | 2 | 2 | 2 | 2 | 2 | 2 | 2 | 3 | 3 | 3 | 3 | 3 | 3 | 3 | 3 |
| 2 | 2 | 2 | 2 | 2 | 2 | 2 | 2 | 3 | 3 | 3 | 3 | 3 | 3 | 3 | 3 |
| 2 | 2 | 2 | 2 | 2 | 2 | 2 | 2 | 3 | 3 | 3 | 3 | 3 | 3 | 3 | 3 |
| 2 | 2 | 2 | 2 | 2 | 2 | 2 | 2 | 3 | 3 | 3 | 3 | 3 | 3 | 3 | 3 |
| 2 | 2 | 2 | 2 | 2 | 2 | 2 | 2 | 3 | 3 | 3 | 3 | 3 | 3 | 3 | 3 |
| 2 | 2 | 2 | 2 | 2 | 2 | 2 | 2 | 3 | 3 | 3 | 3 | 3 | 3 | 3 | 3 |
| 2 | 2 | 2 | 2 | 2 | 2 | 2 | 2 | 3 | 3 | 3 | 3 | 3 | 3 | 3 | 3 |
| 2 | 2 | 2 | 2 | 2 | 2 | 2 | 2 | 3 | 3 | 3 | 3 | 3 | 3 | 3 | 3 |

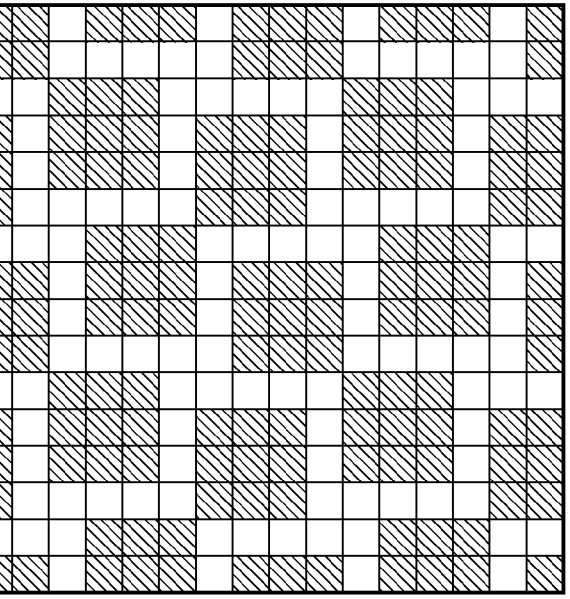
FIG. 13
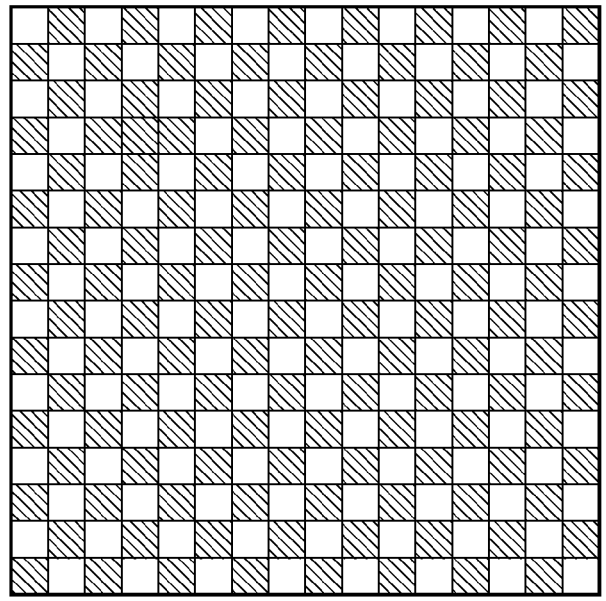
FIG. 14A
FIG. 14B

| IDENTIFICATION INFORMATION | ENCODED DATA OF SB0 | ENCODED DATA OF SB1 OR SB1' | ENCODED DATA OF SB2 OR SB2' | ENCODED DATA OF SB3 OR SB3' |

F I G. 25B

| IDENTIFICATION INFORMATION | ENCODED DATA OF SB0 | ENCODED DATA OF SB1 OR SB1' | ENCODED DATA OF SB2 OR SB2' | ... | ENCODED DATA OF SB8 OR SB8' |

IMAGE ENCODING APPARATUS, IMAGE DECODING APPARATUS, AND CONTROL METHOD THEREFOR

BACKGROUND OF THE INVENTION

1. Field of the Invention

The present invention relates to a technique of encoding and decoding an image.

2. Description of the Related Art

One of generally known compression encoding techniques is JPEG. JPEG divides image data to be encoded into blocks each made up of a plurality of pixels, and performs DCT, quantization, and entropy coding for each block. In the series of processes, a quantization step value used in the quantization process is particularly an important parameter which determines the amount of code. When the quantization step value is set large, the DCT coefficient value becomes 0 or almost 0, increasing the compression ratio. The larger the quantization step value becomes, the larger the difference from an original image before encoding becomes. This appears as degradation of the image quality.

As a technique of increasing the coding efficiency while preventing degradation of the image quality, Japanese Patent Laid-Open No. 10-257494 (to be referred to as reference 1 hereinafter) is known. According to reference 1, an input image is divided into blocks. The code amount of a block encoded without performing difference prediction is compared with that of a block encoded after performing difference prediction. A method exhibiting a smaller amount of code is selected for each block.

However, if an image is encoded at an excessively high compression ratio according to a lossy encoding method, many pieces of image information are omitted, and degradation of the image quality stands out. The above-mentioned conventional encoding method still has room for improvement in terms of reducing the amount of code while maintaining the image quality to some degree.

An attempt has conventionally been made to divide an image into an image (to be referred to as a character-line image hereinafter) such as a character or a line draw image requiring high resolution, and an image (to be referred to as a halftone image hereinafter) such as a photographic image or background, compress these images by different compression methods, and concatenate these data after compression, thereby generating encoded data of a fixed length. As for a character-line image, binary identification information for identifying whether each pixel forms the character-line image, and the pixel value are losslessly encoded with a variable length. To the contrary, a halftone image is lossily encoded to fall within the remaining code amount of a fixed length. To ensure the image quality in fixed length coding, it is considered to be the most important to efficiently perform variable length coding of binary identification information for all patterns, that is, improve the worst value of the compression efficiency.

Conventional methods of compressing binary data are generally MH (Modified Huffman), MR (Modified READ), and MMR (Modified MR) standardized by G3 facsimile of ITU-TS. These methods are compression algorithms based on run length coding. For example, MH is a method of encoding a run length in the raster direction by a predetermined code word.

As a technique of compressing a binary image block, Japanese Patent No. 2936042 (to be referred to as reference 2 hereinafter) is proposed. Reference 2 discloses a technique of dividing a binary image into blocks of 4×4 to 16×16 pixels, replacing each block size with a code, and for the 4×4 size, encoding pixel pattern information in the block of an original image. For other sizes, reference 2 discloses a technique of compositing block tone information codes each obtained by counting the number of black pixels in a block, thereby compressing an image.

These compression methods can efficiently compress simple images with high continuity, like a character or line image, but are not suitable for more complicated images. For example, when PC application software creates a document using a halftone image or semitransparent image and the PC renders the document, patterns as shown in FIGS. 14A and 14B often appear. As is apparent from FIGS. 14A and 14B, a halftone or semitransparent portion is not always expressed by a pixel of a halftone density value, and the density is expressed at a ratio at which pixels of high and low density values appear. An image having many density change points, like ones shown in FIGS. 14A and 14B, cannot ensure a long run length. In many cases, compression algorithms such as MH and MR are not suited to such an image.

In reference 2, the algorithm assures only the density for blocks having sizes other than the 4×4 size, and cannot assure the shapes of the blocks. The shape undesirably changes after decoding.

SUMMARY OF THE INVENTION

The present invention has been made to solve the aforementioned problems, and has as its object to provide an image encoding technique capable of reducing information much more than the conventional one while suppressing degradation of the image quality.

It is another object of the present invention to provide a technique capable of efficient compression.

To solve the above-described problems, for example, an image encoding apparatus according to the present invention comprises the following arrangement.

That is, according to one aspect of the present invention, there is provided an image encoding apparatus which compression-encodes image data, the apparatus comprises: an input unit which inputs image data for each block having a size of a plurality of pixels in horizontal and vertical directions; a generating unit which generates p×q sub-blocks (p and q are positive integers, and at least either of p and q is not less than 2) by scanning a block of interest input from the input unit for each window having a size of p×q pixels, the p×q sub-blocks being formed from pixel data at relatively identical positions in windows; and an encoding unit which encodes each sub-block generated by the generating unit, generating encoded sub-block data.

According to the present invention, a block is scanned for each window having a size of p×q pixels, and encoded into p×q sub-block data each formed from pixel data at relatively identical positions in windows. Even if encoded data exceeds an allowable encoded data amount and encoded data of several sub-blocks are eliminated, the pixels of the eliminated sub-blocks can be easily interpolated from the pixels of existent surrounding sub-blocks.

The present invention can efficiently encode a complicated binary image.

Further features of the present invention will become apparent from the following description of exemplary embodiments with reference to the attached drawings.

BRIEF DESCRIPTION OF THE DRAWINGS

FIG. 2 is a view showing a sub-block division algorithm in the embodiment;

FIGS. 12A and 12B are tables looked up when each distribution unit distributes pixel data in the third embodiment;

FIG. 13 is a view showing the data format of encoded data of one block in the third embodiment;

FIGS. 14A and 14B are views showing image data to be encoded;

FIGS. 24A to 24C are tables looked up when each distribution unit distributes pixel data in the fourth embodiment;

FIGS. 25A and 25B are views each showing the data format of encoded data of one block according to the fourth embodiment;

DESCRIPTION OF THE EMBODIMENTS

Preferred embodiments of the present invention will be described in detail below with reference to the accompanying drawings.

First Embodiment

Figure 1A:
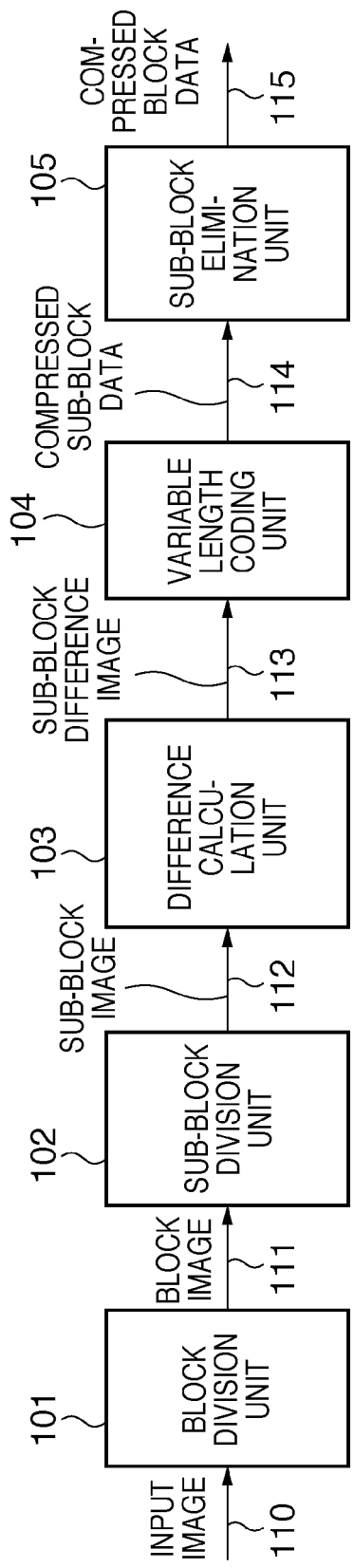
FIGS. 1A and 1B are block diagrams of the arrangements of an image encoding apparatus and decoding apparatus according to the first embodiment.
Figure 1B:
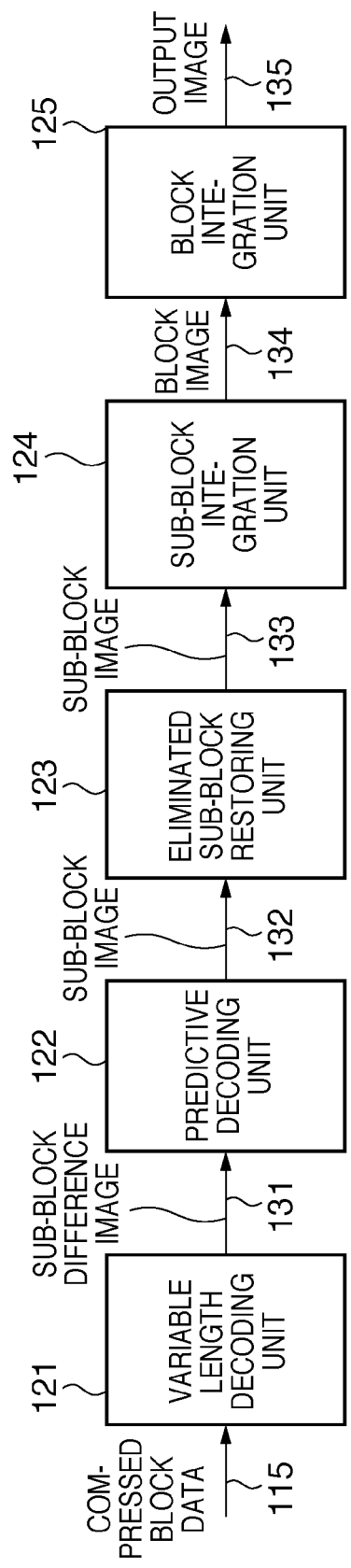

FIG. 1A is a block diagram of the arrangement of an image encoding apparatus in the first embodiment. FIG. 1B is a block diagram of the arrangement of an image decoding apparatus.

The image encoding apparatus comprises a block division unit 101, sub-block division unit 102, difference calculation unit 103, variable length coding unit 104, and sub-block elimination unit 105. The image decoding apparatus comprises a variable length decoding unit 121, predictive decoding unit 122, eliminated sub-block restoring unit 123, sub-block integration unit 124, and block integration unit 125.

The image encoding apparatus will be explained first.

The block division unit 101 receives image data to be encoded via a signal line 110 for each block made up of a plurality of pixels. The block division unit 101 outputs the received block image to the sub-block division unit 102 via a signal line 111. Image data of a block will be simply referred to as a block image or block image data.

The horizontal and vertical sizes (the numbers of pixels) of a block are integer multiples of sub-blocks (to be described later). In the first embodiment, the block size is 16×16 pixels, and the sub-block size is 8×8 pixels for descriptive convenience. Note that the block and sub-block need not be square. The input source of image data to be encoded is an image scanner in the embodiment. However, the type of input source is arbitrary such as a storage device which stores uncompressed image data.

The sub-block division unit 102 divides the received block image data into a plurality of sub-block data, and outputs the image of each sub-block data (to be referred to as a sub-block image or sub-block image data hereinafter) to the difference calculation unit 103 via a signal line 112. That is, the sub-block division unit 102 functions as a sub-block generating unit which generates a plurality of sub-blocks from an input block image. Since the sub-block size is 8×8 pixels, as described above, four sub-block images are generated from one block image.

A division process by the sub-block division unit 102 in the first embodiment will be exemplified with reference to FIG. 2.

FIG. 2 shows an example of generating four sub-block data SB(0) to SB(3) from a block image B of 16×16 pixels.

The block image B is raster-scanned for each window of 2×2 pixels, and sub-blocks SB(0) to SB(3) are generated from pixels at relatively identical positions in windows. More specifically, a pixel at the upper left position in a 2×2 window is extracted as a pixel of the sub-block SB(0). Similarly, a pixel at the upper right position in the 2×2 window is extracted as a pixel of the sub-block SB(1). A pixel at the lower left position is extracted as a pixel of the sub-block SB(2). A pixel at the lower right position is extracted as a pixel of the sub-block SB(3). "k" in the sub-block SB(k) is a number assigned in the raster scan order when determining pixels of a sub-block from 2×2 windows in a block image. The number "k" will be called a sub-block number.

Letting B(x,y) be a pixel value at the coordinates (x,y) in the block image B, and SB(k,x,y) be a pixel value in the sub-block SB(k) (k=0, 1, 2, 3), they have the following relationship:

$$SB(0,i,j)=B(2\times i,2\times j)$$

$$SB(1,i,j)=B(2\times i+1,2\times j)$$

$$SB(2,i,j)=B(2\times i,2\times j+1)$$

$$SB(3,i,j)=B(2\times i+1,2\times j+1)$$

(where i, j=0, 1, ..., 7)

A process by the difference calculation unit 103 will be explained. The difference calculation unit 103 receives the sub-blocks SB(0) to SB(3) output from the sub-block division unit 102 in the above-described manner. The difference calculation unit 103 directly outputs the sub-block SB(0) to the variable length coding unit 104 via a signal line 113. As for the sub-block SB(k) (k≧1) of interest, the difference calculation unit 103 calculates the difference between pixels at identical positions in the sub-block SB(k) and the sub-block SB(0). Since one sub-block is made up of 8×8 pixels, there are 8×8 calculated difference data. The 8×8 difference data calculated between the sub-blocks SB(k) and SB(0) will be called a sub-block difference image SB'(k). The difference calculation unit 103 calculates sub-block difference images SB'(1) to SB'(3) by $$SB'(1)=SB(1,i,j)-SB(0,i,j)$$

$$SB'(2)=SB(2,i,j)-SB(0,i,j)$$

$$SB'(3)=SB(3,i,j)-SB(0,i,j)$$

(where i, j=0, 1, ..., 7)

As a result of the calculation, each pixel in the sub-block difference image SB'(k) must be expressed by a value of {−255 to +255}, that is, data exceeding eight bits. Hence, the sub-block difference images SB'(1) to SB'(3) may also be calculated as follows. More specifically, letting XOR(Z0,Z1) be the exclusive-OR of two data Z0 and Z1, $$SB'(1)=XOR\{SB(1,i,j),SB(0,i,j)\}$$

$$SB'(2)=XOR\{SB(2,i,j),SB(0,i,j)\}$$

$$SB'(3)=XOR\{SB(3,i,j),SB(0,i,j)\}$$

In this case, as long as SB(0,i,j) is known, the original sub-block images SB(1) to SB(3) can be restored by $$SB(1)=XOR\{SB'(1,i,j),SB(0,i,j)\}$$

$$SB(2)=XOR\{SB'(2,i,j),SB(0,i,j)\}$$

$$SB(3)=XOR\{SB'(3,i,j),SB(0,i,j)\}$$

Figure 3:
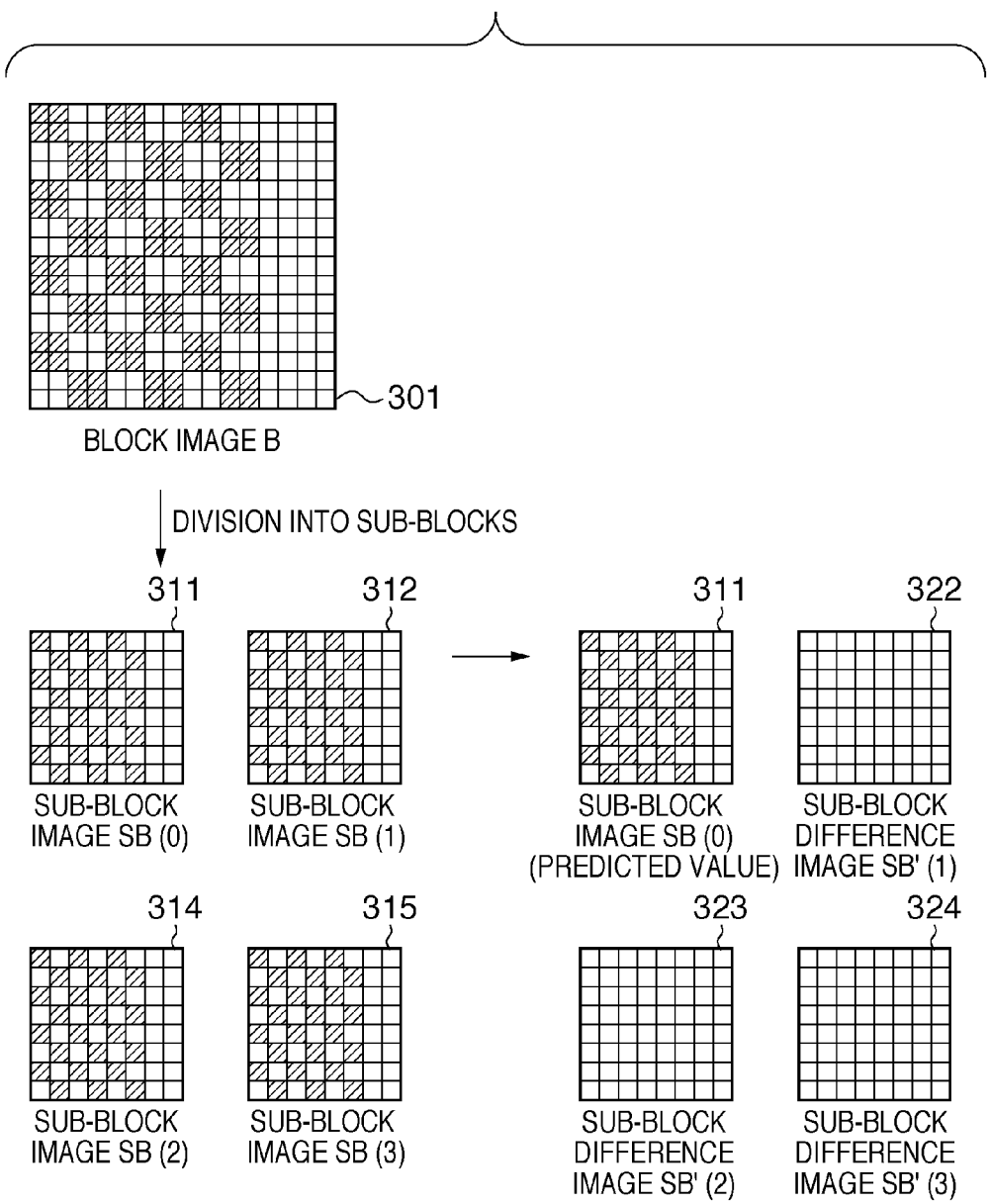
FIG. 3 is a view showing an example of a sub-block difference process in the embodiment.

FIG. 3 shows an example of a sub-block difference image. In FIG. 3, a block image 301 is represented by pixels of two colors, that is, white and black for descriptive convenience. The block image is divided into sub-blocks, generating sub-block images SB(0) 311 to SB(3) 314 shown in FIG. 3. The difference calculation unit 103 directly outputs the sub-block image SB(0) to the variable length coding unit 104. For the remaining sub-blocks SB(1) to SB(3), the difference calculation unit 103 calculates differences from pixel values in the sub-block SB(0) serving as predicted values, generating sub-block difference images SB'(1) 322 to SB'(3) 324 shown in FIG. 3. Then, the difference calculation unit 103 supplies the sub-block difference images SB'(1) 322 to SB'(3) 324 to the variable length coding unit 104.

Pixels at the coordinates (x, y) in respective sub-blocks are pixels adjacent to each other in an original block image, so these pixels are highly likely to have the same color or similar colors. Since FIG. 3 shows an extreme example, pixels in the sub-block difference images SB'(1) to SB'(3) have a value of white (0). In practice, it is a rare case that all pixels in the sub-block difference images SB'(1) to SB'(3) have "0". However, at least compared with the sub-block SB(0), these pixels are highly likely to have a value of almost 0.

The variable length coding unit 104 will be described. The variable length coding unit 104 encodes the sub-block image SB(0), and sub-block difference images SB'(1), SB'(2), and SB'(3) in the order named, and outputs encoded data (encoded sub-block data) in this order to the sub-block elimination unit 105 via a signal line 114.

Figure 4:
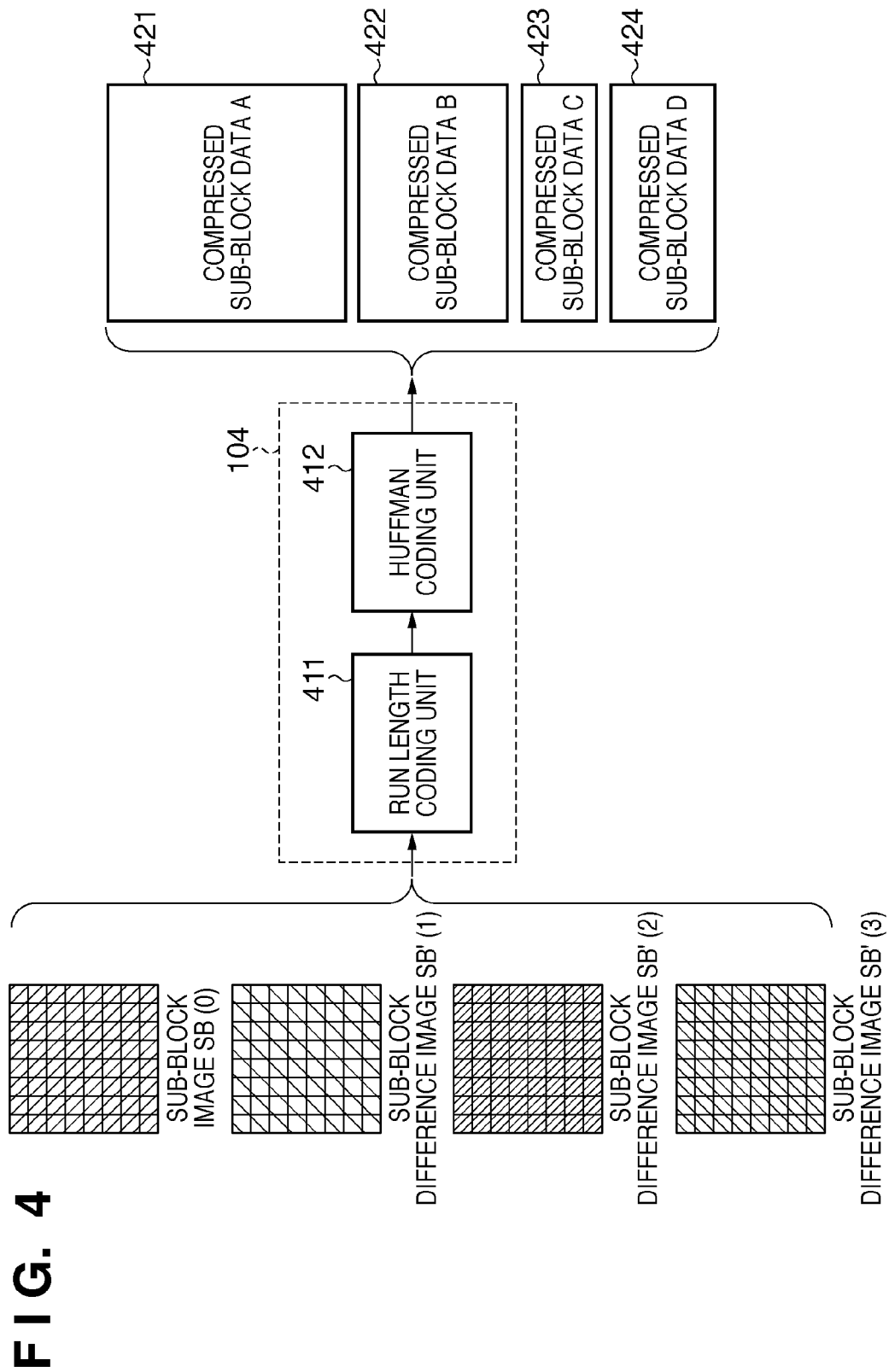
FIG. 4 is a view showing the process contents of a variable length coding unit in the embodiment.

The variable length coding unit 104 employs coding as a combination of run length coding and Huffman coding which are generally used as variable length coding methods. FIG. 4 shows an example of compression encoding in the variable length coding unit 104. A run length coding unit 411 encodes the run lengths of the sub-block image SB(0), and sub-block difference images SB'(1), SB'(2), and SB'(3) in the order named, and outputs the encoded data to a Huffman coding unit 412. The sub-block difference images SB'(1), SB'(2), and SB'(3) are highly likely to have the same difference value, as shown in the example of FIG. 3, so the data compression by the run length coding unit 411 is effective. Since coding by the run length coding unit 411 is local, the Huffman coding unit 412 further executes compression encoding in order to compress the pattern of the entire data string. The variable length coding unit 104 supplies compressed sub-block data 421 to 424 as variable length coding results to the sub-block elimination unit 105 via the signal line 114. The sub-block elimination unit 105 receives the compressed sub-block data 421, 422, 423, and 424, that is, compressed data of the sub-block image SB(0), and sub-block difference images SB'(1), SB'(2), and SB'(3) in the order named.

However, this is merely an example of coding, and another coding technique may also be adopted. Since the same pixel value is less likely to run in the sub-block SB(0), the sub-block may also be raster-scanned and predictively encoded.

The sub-block elimination unit 105 sequentially receives the compressed sub-block data 421 to 424 from the variable length coding unit 104, stores them in an internal memory, and obtains the encoded data amount of each sub-block. The sub-block elimination unit 105 determines, as compressed sub-block data to be output, compressed sub-block data having the encoded data amount of one block equal to or smaller than a preset maximum data size (threshold) of one block.

For example, letting L(0) to L(3) be the data amounts of the compressed sub-block data 421 to 424, and Th be a threshold representing an allowable encoded data amount, a maximum integer i which satisfies the following inequality is calculated using a consolidation function Σ:

$$\Sigma L(i) \leq Th$$

For example, when L(0)+L(1)+L(2)≦Th and L(0)+L(1)+L(2)+L(3)>Th, the variable i is "2". Hence, compressed data of the three compressed sub-block data 421 to 423 corresponding to one block are built, and the compressed sub-block data 424 is discarded. Discarded compressed sub-block data will be called omitted sub-block data.

The order to determine omitted sub-block data is the descending order of the sub-block number, but is not limited to this as long as the encoding apparatus uses the same order as that in the decoding apparatus. Note that compressed sub-block data of sub-block block number 0 is compressed data of the sub-block SB(0) serving as a reference used to calculate the difference of a sub-block difference image, and is set not to be eliminated. The threshold is desirably determined in consideration of this.

In the above-described manner, the sub-block elimination unit 105 sequentially arranges compressed sub-block data not to be eliminated, builds encoded data of one block, and outputs it via a signal line 115. To build encoded data of one block with a fixed length (which suffices to equal the threshold), an EOSB (End Of Sub Block) code word or predetermined dummy data suffices to be inserted into a part short of the fixed length. This is effective particularly when a fixed-length compression process is executed by hardware which can prepare only a buffer of a small capacity.

To build encoded data of one block with a variable length, a block header is added to the head of encoded data of one block. Then, the minimum value among the sub-block numbers of eliminated sub-blocks (the number of eliminated sub-blocks is not limited to one), or the maximum value among the sub-block numbers of existent compressed sub-block data is stored in the block header. In this case, the criterion for elimination is desirably not the amount of code but an image quality evaluation value such as the cumulative value of the absolute values of errors upon interpolation.

The process contents of the image encoding apparatus in the first embodiment have been described. Next, the process contents of each processing unit of the image decoding apparatus (see FIG. 1B) in the first embodiment will be explained. In the following description, encoded data of one block has a fixed length.

Figure 5:
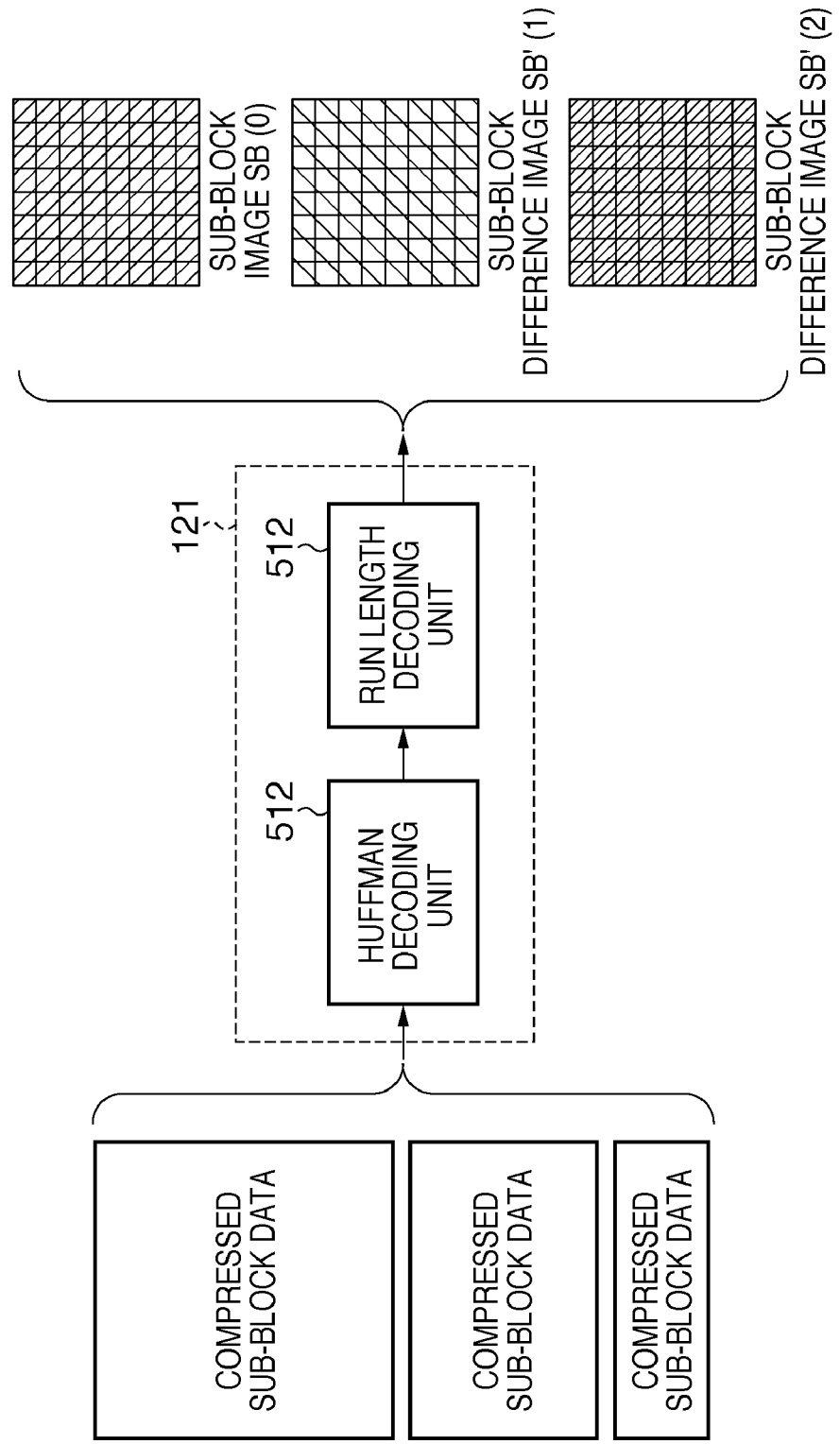
FIG. 5 is a view showing the decoding process contents of a variable length decoding unit in the embodiment.

As shown in FIG. 5, the variable length decoding unit 121 comprises a Huffman decoding unit 511 and run length decoding unit 512. This arrangement is reverse to that of the variable length coding unit 104 in FIG. 4.

The variable length decoding unit 121 receives encoded data (fixed length) of one block via the signal line 115, and decodes it in the order of the sub-block SB(0), and sub-block difference images SB'(1), SB'(2), and SB'(3). At this time, for example, when the variable length decoding unit 121 detects EOSB, it outputs, to the predictive decoding unit 122 via a signal line 131, the results of decoding compressed sub-block data until the detection, and the sub-block number of finally decoded compressed sub-block data.

Assume that encoded data of one block stores encoded data of the sub-block SB(0), and sub-block block difference images SB'(1) and SB'(2), as shown in FIG. 5. That is, encoded data of the sub-block difference image SB'(3) does not exist. In this case, as shown in FIG. 5, the sub-block image SB(0), and sub-block difference images SB'(1) and SB'(2) are decoded from the three compressed sub-block data.

The predictive decoding unit 122 directly outputs the received sub-block SB(0) to the eliminated sub-block restoring unit 123 via a signal line 132. As for the received sub-block difference image SB'(k), the predictive decoding unit 122 restores the sub-block image SB(k) by adding a difference value at each pixel position in the sub-block difference image SB'(k) and a pixel value at a corresponding position in the sub-block image SB(0):

$$SB(1)=SB'(1,i,j)+SB(0,i,j)$$

$$SB(2)=SB'(2,i,j)+SB(0,i,j)$$

$$SB(3)=SB'(3,i,j)+SB(0,i,j)$$

In FIG. 5, the sub-block difference image SB'(3) does not exist, so the predictive decoding unit 122 does not generate the sub-block image SB(3). The predictive decoding unit 122 outputs the restored sub-block images SB(0) to SB(2) and the sub-block number ("2" in FIG. 5) of the finally restored sub-block image to the eliminated sub-block restoring unit 123 via the signal line 132.

When the predictive decoding unit 122 notifies the eliminated sub-block restoring unit 123 of a sub-block number "3", that is, that all sub-blocks have been restored, the eliminated sub-block restoring unit 123 directly outputs the received sub-block images SB(0) to SB(3) to the sub-block integration unit 124 via a signal line 133.

Figure 6:
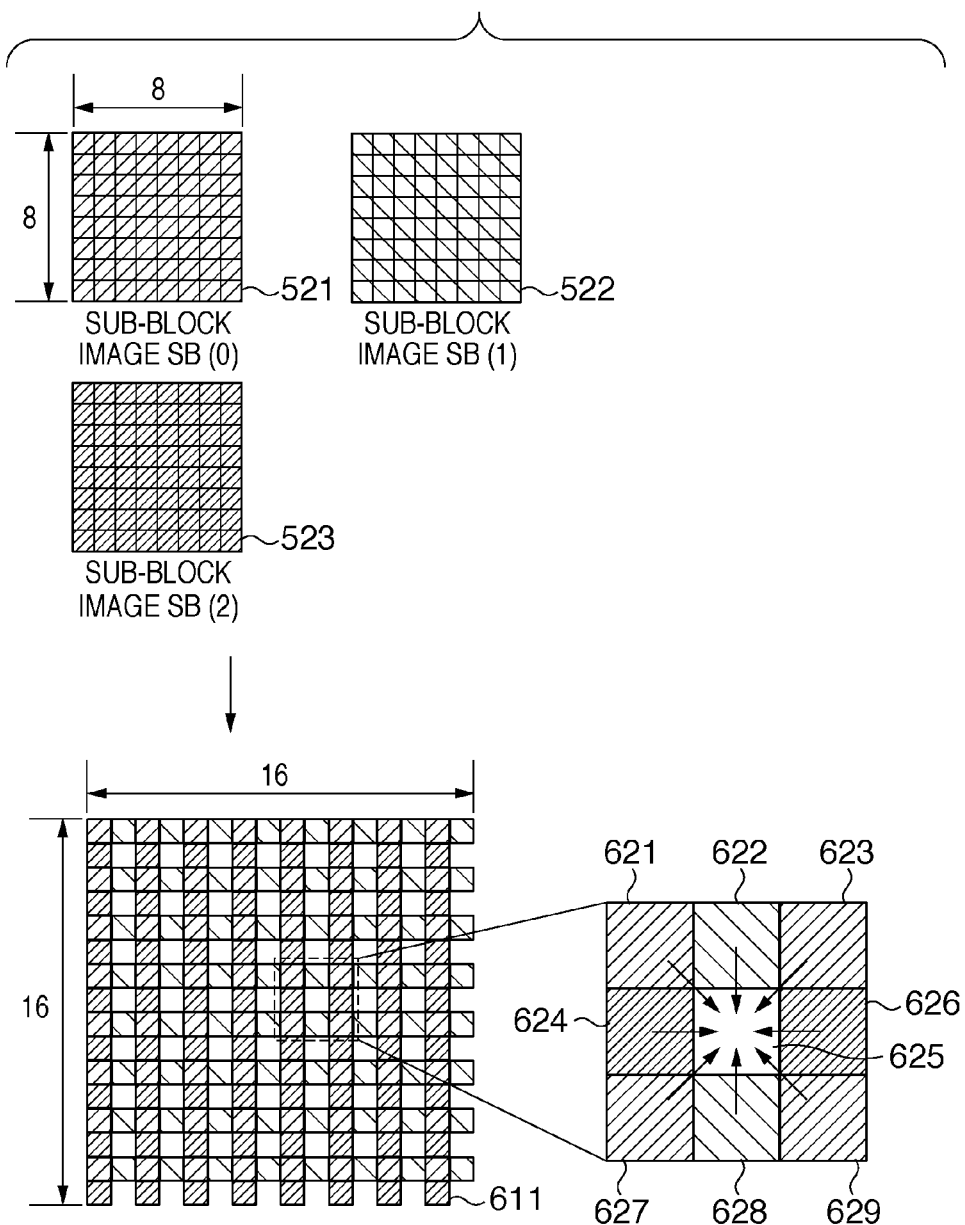
FIG. 6 is a view showing an example of an omitted pixel restoring process in the embodiment.

To the contrary, when the predictive decoding unit 122 notifies the eliminated sub-block restoring unit 123 of a sub-block number ("2" or smaller) smaller than "3", the signal line 132 restores an omitted sub-block image. Assume that the sub-blocks SB(0) 521 to SB(2) 523 in FIG. 6 have been restored, and the sub-block SB(3) is omitted, as shown in FIG. 6. In this case, image data 611 will be considered on the assumption that the sub-block SB(3) exists. Eight pixels 621 to 624 and 626 to 629 in FIG. 6 around each omitted pixel position represented by the sub-block SB(3) are pixel data in existent sub-blocks. The eliminated sub-block restoring unit 123 restores the pixel value of an omitted pixel position 625 from the values of the pixels in the existent sub-blocks by using interpolative prediction (interpolation).

In FIG. 6, as for omitted pixels at positions on the bottom line and right end line of the block that are defined in the sub-block SB(3), the number of pixels around each omitted pixel is smaller than 8. In this case, the value of the omitted pixel is calculated from referable existent pixels. The value of the omitted pixel may also be calculated from the values of two existent pixels on the two sides of the omitted pixel.

When two sub-block images, that is, the sub-block images SB(0) and SB(1) have been restored, the number of pixels positioned near (or around) one omitted pixel is two or three. Thus, the value of the omitted pixel is calculated by interpolation using these pixels.

When only the sub-block image SB(0) has been restored, the three remaining sub-block images SB(1) to SB(3) are restored by performing linear interpolation using the pixel values of the sub-block image SB(0). Note that pixel values in the sub-block SB(0) are directly used for pixel positions on the bottom line and right end line of the block that are defined in the sub-blocks SB(1) to SB(3).

Since the sub-block division unit 102 distributes neighboring pixels (2×2 pixels in the embodiment) of one block to a plurality of sub-blocks in compression, a sufficient number of peripheral pixels available for the interpolation process can be ensured. This can minimize degradation of the image quality caused by pixel omission.

The sub-block integration unit 124 executes an integration process on the assumption that pixels at the identical positions in the four sub-block data restored in the aforementioned way are 2×2 adjacent pixels in an original block. More specifically, the sub-block integration unit 124 generates a block image by rearranging the pixels of the sub-block images SB(0) to SB(3) in an original block (16×16 pixels). The sub-block integration unit 124 outputs the block image to the block integration unit 125 via a signal line 134. The block integration unit 125 concatenates 16×16-pixel block images input from the sub-block integration unit 124, generating an entirely decompressed image. Then, the block integration unit 125 outputs the decompressed image via a signal line 135.

The arrangements and processes of the image encoding apparatus and decoding apparatus according to the first embodiment have been described. In the first embodiment, the size of one block is 16×16 pixels, and that of one sub-block is 8×8 pixels, but the present invention is not limited to them. When the image of one block is raster-scanned for each window of p×q pixels (p and q are positive integers, and at least either of them is 2 or more), p×q sub-blocks can be generated. The sub-blocks SB(0) to SB(p×q−1) in this case are given by the following equations, where mod(a,b) is a remainder when an integer a is divided by an integer b, and floor(c) is a function representing a maximum integer which does not exceed a real number c:

$$SB(0, i, j) = B(p \times i, q \times j)$$

$$SB(1, i, j) = B(p \times i + 1, q \times j)$$

$$\vdots$$

$$SB(s, i, j) = B(p \times i + \mathrm{mod}(s, p), q \times j + \mathrm{floor}(s/q))$$

$$\vdots$$

$$SB(p \times q - 1, i, j) =$$
$$B(p \times i + \mathrm{mod}(p \times q - 1, p), q \times j + \mathrm{floor}((p \times q - 1)/q))$$

(Letting m be the number of pixels in the horizontal direction of the sub-block and n be the number of pixels in the vertical direction, i and j meet $0 \leq i \leq m-1$ and $0 \leq j \leq n-1$.)

When more than 2×2 sub-blocks are generated from one block, a predicted value used to generate the sub-block difference image SB'(k) of the sub-block image SB(k) of interest is desirably a pixel value in a sub-block adjacent to the sub-block of interest among preceding sub-blocks. This is because a sub-block SB adjacent to the sub-block of interest has pixels close in space and distance to the pixels of the sub-block (k). When generating the sub-block difference image SB'(k), the sub-block image SB(k) and a sub-block SB(k−j) (j<k, and j is a positive integer) adjacent to the sub-block of interest may also be exclusive-ORed. Alternatively, interpolative prediction may also be done using the pixel values of sub-blocks adjacent to the sub-block of interest among preceding sub-blocks.

In the first embodiment, the value of an omitted pixel is obtained by performing interpolative prediction in predictive decoding. In general, pixels have a local correlation in an image. Thus, the correlation direction is detected in a compression process to save the detection result. In decoding, an omitted pixel is restored by prediction from peripheral pixels using the correlation direction. This can also increase the restoring precision. For example, the variable length coding unit 104 performs encoding in a plurality of scan directions, such as the vertical direction, horizontal direction, 45° zigzag, and 135° zigzag. In this case, the correlation is high in a scan direction in which the amount of code becomes minimal. Thus, the correlation direction may also be determined from the amount of code in the scan direction.

In the first embodiment, compressed sub-block data are eliminated by the sub-block elimination unit 105 in the fixed order (descending order) of the sub-block number. However, compressed sub-block data may also be eliminated in the ascending order of the encoded data amount. In this case, the sub-block number of eliminated compressed sub-block data is stored in the block header, and existent compressed sub-block data are handled on the assumption that they are arranged in ascending order.

When an image to be encoded is a binary image and the number of "1"s (the number of pixels failing in prediction) in a sub-block is smaller than a predetermined threshold, this means that the sub-block is highly likely to be restorable. For this reason, the amount of code may also be controlled by eliminating sub-blocks in the ascending order of the number of "1"s in a sub-block. Alternatively, sub-blocks may also be eliminated in the descending order of a restoring error. Particularly when a plurality of sub-blocks are eliminated, the restoring order is important because it influences the restored image quality. A sub-block to be eliminated is determined based on the amount of code in the first embodiment, but may also be determined based on the image quality (restoring error). For example, it is possible to arrange a means for accumulating the absolute value of a difference from a predicted value for each sub-block, and not to transmit data of a sub-block whose cumulative value is equal to or smaller than a predetermined value.

Second Embodiment

Figure 7A:
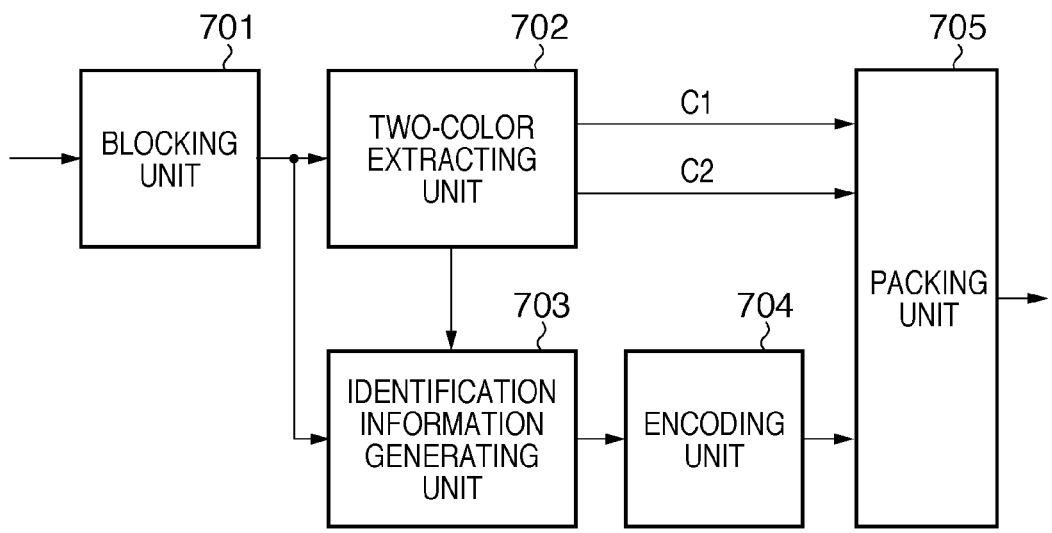
FIGS. 7A and 7B are block diagrams of the arrangements of an image encoding apparatus and decoding apparatus according to the second embodiment.
Figure 7B:
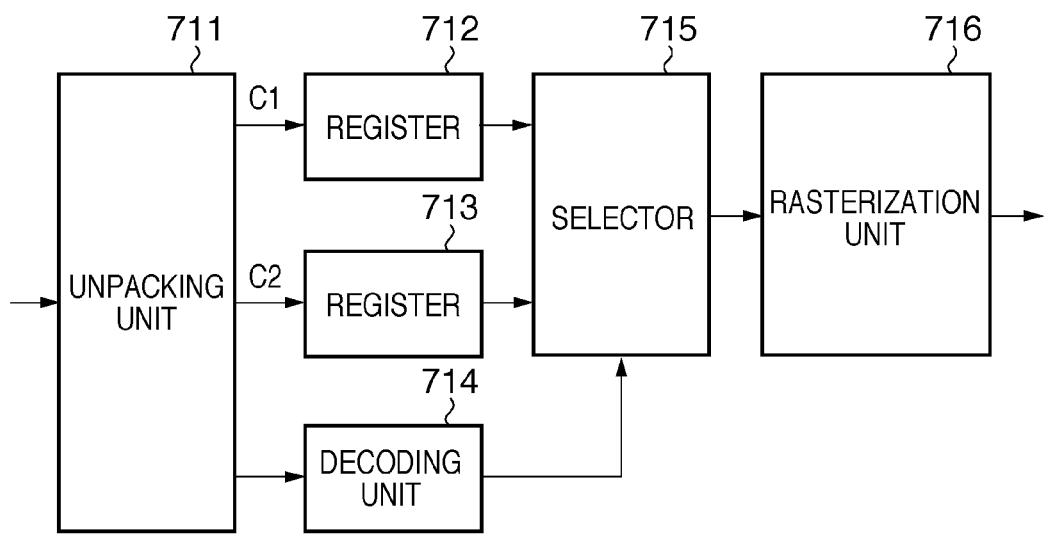

FIG. 7A is a block diagram of the arrangement of an image encoding apparatus in the second embodiment. FIG. 7B is a block diagram of the arrangement of an image decoding apparatus. The image encoding apparatus and image decoding apparatus in the second embodiment will become apparent from the following description, and are particularly suitable for a character-line image.

The image encoding apparatus in the second embodiment comprises a blocking unit 701, two-color extracting unit 702, identification information generating unit 703, encoding unit 704, and packing unit 705. The image decoding apparatus comprises an unpacking unit 711, registers 712 and 713, a decoding unit 714, a selector 715, and a rasterization unit 716. Buffer memories are interposed between the respective processing units in order to establish synchronization, but are not shown in FIG. 7A.

The image encoding apparatus in the second embodiment will be explained first. Also in the second embodiment, the size of one block is 16×16 pixels for descriptive convenience. However, it is sufficient that one block is made up of a plurality of pixels, and the numbers of pixels of the block in the horizontal and vertical directions are integer multiples of those of a sub-block (to be described later) in the horizontal and vertical directions. Also in the following description, an image is formed from one color component (monochrome image), and one pixel is represented by eight bits (256 tones).

The blocking unit 701 receives image data to be encoded for each block (=16×16 pixels), and outputs the image of one block to the two-color extracting unit 702 and identification information generating unit 703. The image of one block will also be called a block image, similar to the first embodiment.

The two-color extracting unit 702 extracts two representative colors C1 and C2 from the received block image. More specifically, the two-color extracting unit 702 calculates the average AVE of the values of pixels in the block. The two-color extracting unit 702 classifies pixels into a group (first group) of pixels having pixel values equal to or smaller than the calculated average AVE, and a group (second group) of pixels having pixel values larger than the average. The two-color extracting unit 702 calculates the average of pixels belonging to the first group, and determines it as the representative color C1. Similarly, the two-color extracting unit 702 calculates the average of pixels belonging to the second group, and determines it as the representative color C2. The two-color extracting unit 702 outputs the determined representative colors C1 and C2 to the packing unit 705, and outputs the average AVE to the identification information generating unit 703.

When a difference D (=C2−C1) between C2 and C1 is equal to or smaller than a preset threshold, particularly when all pixels in a block of interest have the same color (corresponding to C2=C1), both C1 and C2 are set as AVE. In this case, identification information can also be eliminated. That is, C1 and C2 are compared with each other in decoding, and if C2=C1, all pixel values in the block are replaced with C1 (or C2).

The identification information generating unit 703 raster-scans a block image of interest. At this time, the identification information generating unit 703 compares a pixel value with the average AVE obtained from the two-color extracting unit 702, and generates binary (1-bit) information which is "0" for a pixel having a value equal to or smaller than the average AVE, and "1" for a pixel having a value larger than the average AVE. The identification information generating unit 703 outputs the generated information to the encoding unit 704. In short, this information is used to identify which of the first and second groups contains each pixel in a block of interest. Therefore, this information will be called identification information. In the second embodiment, the size of one block is 16×16 pixels, so identification information of one block is formed from 16×16 (=256) bits.

The encoding unit 704 divides the 16×16-bit identification information input from the identification information generating unit 703 into a plurality of (four) sub-blocks in accordance with the same algorithm as that in the first embodiment, and encodes each sub-block. Details of the encoding unit 704 will be described later.

The packing unit 705 concatenates the representative colors C1 and C2 and the identification information encoded by the encoding unit 704, and outputs them as encoded data of one block.

Details of the encoding unit 704 in the second embodiment will be described with reference to FIG. 8.

Figure 8:
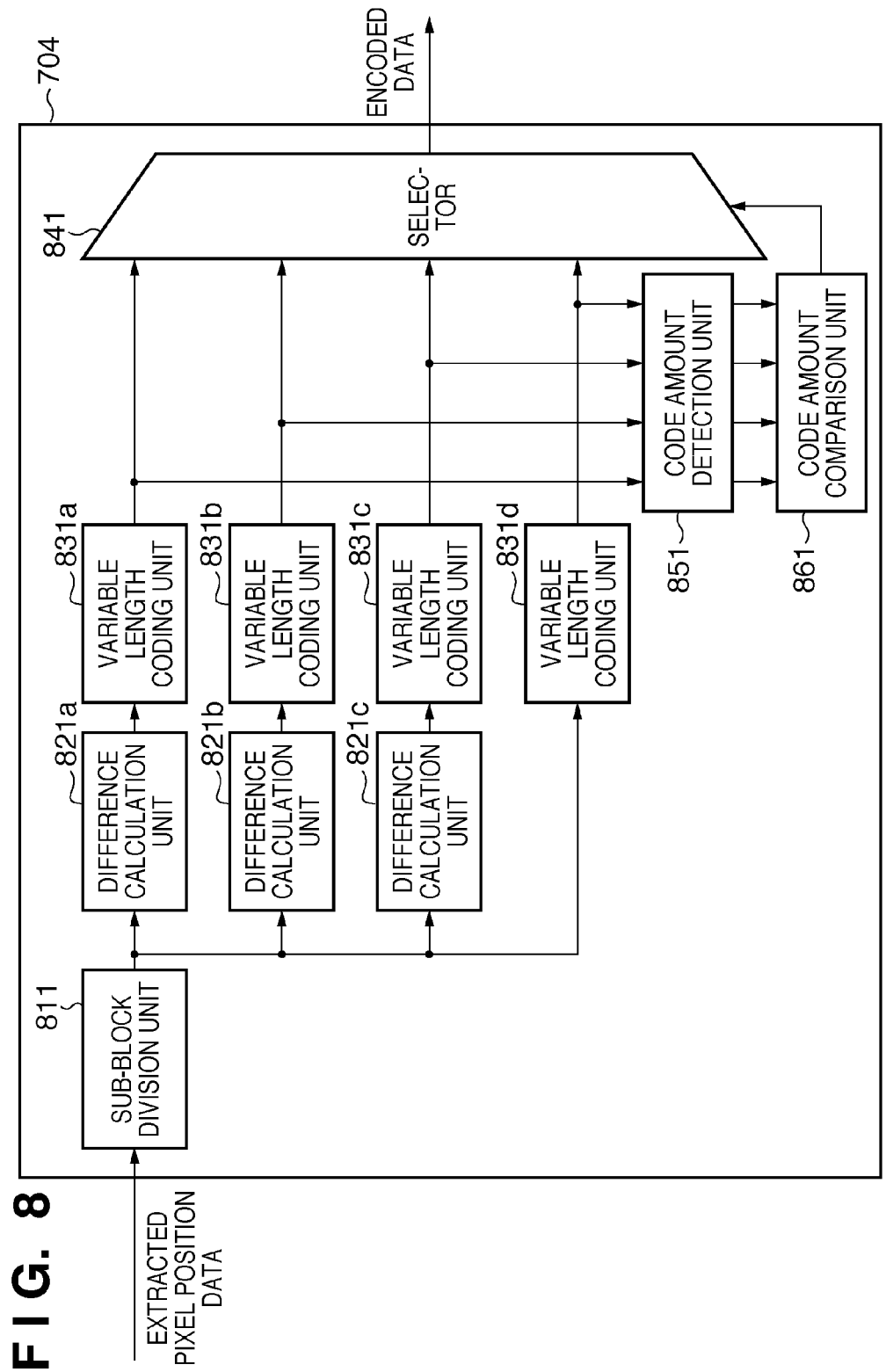
FIG. 8 is a block diagram of the arrangement of an encoding unit in the second embodiment.

As shown in FIG. 8, the encoding unit 704 comprises a sub-block division unit 811, difference calculation units 821a to 821c, variable length coding units 831a to 831d, a code amount detection unit 851, a code amount comparison unit 861, and a selector 841.

Similar to the sub-block division unit 102 in the first embodiment, the sub-block division unit 811 divides input 16×16 pieces of identification information (binary data) into four sub-blocks. The relationship between the identification information of a block and that of each sub-block in the second embodiment is the same as that in FIG. 2 except that the block and sub-block represent image data in the first embodiment, whereas they represent binary identification information in the second embodiment. Hence, also in the second embodiment, each sub-block is expressed as SB(k) using the sub-block number k. Similar to the first embodiment, letting B(x,y) be identification information at the coordinates (x,y) in 16×16-bit identification information, and SB(k,x,y) be identification information in the sub-block SB(k) (k=0, 1, 2, 3), they have the following relationship:

$$SB(0,i,j)=B(2\times i,2\times j)$$

$$SB(1,i,j)=B(2\times i+1,2\times j)$$

$$SB(2,i,j)=B(2\times i,2\times j+1)$$

$$SB(3,i,j)=B(2\times i+1,2\times j+1)$$

The sub-block division unit 811 outputs the sub-block SB(0) to the difference calculation units 821a to 821c and the variable length coding unit 831d. The sub-block division unit 811 outputs the sub-block SB(1) to the difference calculation unit 821a, the sub-block SB(2) to the difference calculation unit 821b, and the sub-block SB(3) to the difference calculation unit 821c.

The difference calculation units 821a to 821c calculate sub-block difference information SB'(1) to SB'(3):

$$SB'(1)=SB(1,i,j)-SB(0,i,j)$$

$$SB'(2)=SB(2,i,j)-SB(0,i,j)$$

$$SB'(3)=SB(3,i,j)-SB(0,i,j)$$

As a result of the calculation, the difference value of identification information at each pixel position of SB'(0) may take values $\{-1, 0, +1\}$, but may also take two values. More specifically, letting XOR(Z0,Z1) be the exclusive-OR of two, 1-bit data Z0 and Z1, the sub-block difference information SB'( ) is given by $$SB'(1)=XOR\{SB(1,i,j),SB(0,i,j)\}$$

$$SB'(2)=XOR\{SB(2,i,j),SB(0,i,j)\}$$

$$SB'(3)=XOR\{SB(3,i,j),SB(0,i,j)\}$$

The variable length coding units 831a to 831d perform variable length coding for the sub-block difference information SB'(1), SB'(2), and SB'(3), and sub-block information SB(0), and output the compressed sub-block data to the selector 841 and code amount detection unit 851.

Encoded data generated by the variable length coding unit 831d is encoded data of the sub-block information SB(0) having sub-block number "0", and the data amount of the encoded data is represented by L(0). Also, encoded data generated by the variable length coding units 831a to 831c are encoded data of the sub-block difference information SB'(1) to SB'(3), and the encoded data amounts are represented by L(1) to L(3) in accordance with the sub-block numbers.

The code amount detection unit 851 detects L(0) to L(3), and outputs the detection results to the code amount comparison unit 861.

By using a preset threshold Th, the code amount comparison unit 861 obtains the maximum value of a variable i which satisfies the following inequality, and outputs the result to the selector 841:

$$\Sigma L(i) \leq Th$$

For example, when L(0)+L(1)+L(2)≦Th and L(0)+L(1)+L(2)+L(3)>Th, the variable i is "2". Thus, the code amount comparison unit 861 outputs a signal representing "2" to the selector 841.

The selector 841 receives and outputs encoded data corresponding in number to the signal input from the code amount comparison unit 861 out of four encoded data generated by the variable length coding units 831d, 831a, 831b, and 831c. For example, when the signal input from the code amount comparison unit 861 represents "2", the selector 841 concatenates encoded data from the variable length coding units 831d, 831a, and 831b in the order named. To adjust the concatenated encoded data to a fixed length, the selector 841 adds dummy bits by the shortage from the fixed length, and outputs the resultant encoded data. In the above-described case, the selector 841 discards encoded data from the variable length coding unit 831c.

The image encoding apparatus in the second embodiment has been described. Next, the image decoding apparatus (see FIG. 7B) in the second embodiment will be explained.

The unpacking unit 711 divides input encoded data of one block into the representative colors C1 and C2 and encoded identification information. The unpacking unit 711 outputs the representative color C1 to the register 712, the representative color C2 to the register 713, and the encoded identification information to the decoding unit 714. Although details of the decoding unit 714 will be described later, the decoding unit 714 decodes received identification information to generate 16×16 pieces of binary identification information, and outputs them to the selector 715 in the raster scan order.

When an element of the identification information from the decoding unit 714 is "0", the selector 715 selects the representative color C1 stored in the register 712, and outputs it to the rasterization unit 716. When an element of the identification information from the decoding unit 714 is "1", the selector 715 selects the representative color C2 stored in the register 713, and outputs it to the rasterization unit 716. The selector 715 performs this process 16×16 times during the decoding process of one block, outputting a block image made up of 16×16 pixels to the rasterization unit 716. The rasterization unit 716 incorporates a buffer memory, and outputs pixel data in the raster scan order at least every time image data of pixels to be restored in the horizontal direction are stored.

Figure 9:
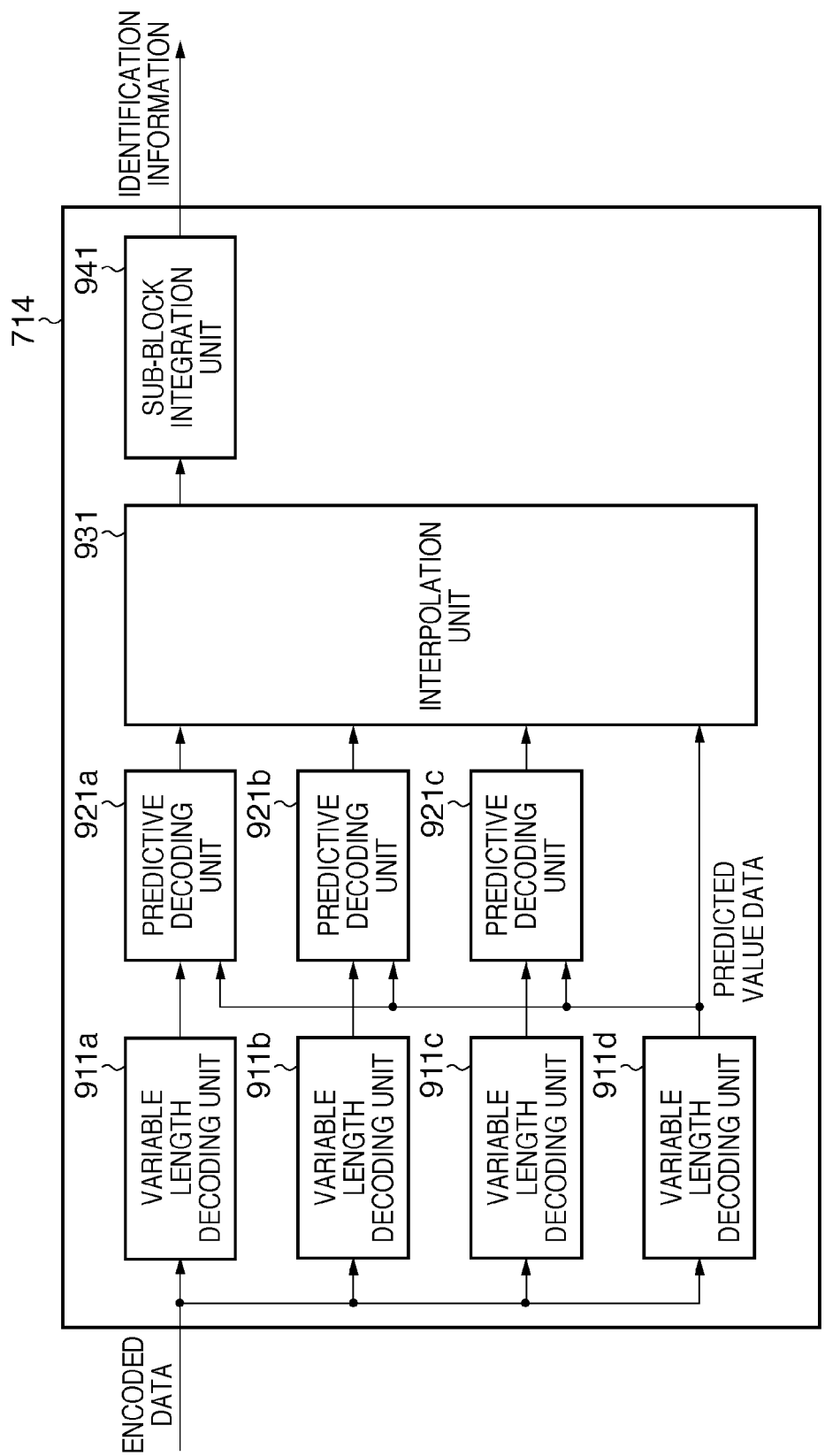
FIG. 9 is a block diagram of the arrangement of a decoding unit in the second embodiment.

The decoding unit 714 will be explained with reference to FIG. 9. FIG. 9 is a block diagram of the arrangement of the decoding unit 714 in the second embodiment.

The decoding unit 714 comprises variable length decoding units 911a to 911d, predictive decoding units 921a to 921c, an interpolation unit 931, and a sub-block integration unit 941.

The variable length decoding units 911a to 911d are paired with the variable length coding units 831a to 831d in FIG. 8, and decode the sub-block difference information SB'(1) to SB'(3) and sub-block information SB(0). The decoding unit 714 receives compressed data of respective sub-blocks from the unpacking unit 711 in the order of the sub-block number, and assigns them to the variable length decoding units 911d, 911a, 911b, and 911c in the order named. If received encoded data of one block contains only encoded data of three sub-blocks, the decoding unit 714 does not supply encoded data to the variable length decoding unit 911c.

The variable length decoding units 911a to 911d respectively perform a decoding process. The variable length decoding unit 911d outputs decoded sub-block information SB(0) to the predictive decoding units 921a to 921c and the interpolation unit 931. The remaining variable length decoding units 911a to 911c output sub-block difference information SB'(1) to SB'(3) obtained by decoding to the corresponding predictive decoding units 921a to 921c. A variable length decoding unit which has not received encoded data to be decoded outputs, to a corresponding predictive decoding unit, a signal representing that no encoded data has been decoded.

The predictive decoding unit 921a receives the sub-block information SB(0) as a predicted value, and adds it and the sub-block difference information SB'(1), restoring the sub-block information SB(1). The remaining predictive decoding units 921b and 921c also execute the same process, restoring the sub-block information SB(2) and SB(3). A predictive decoding unit, which has received from a corresponding variable length decoding unit a signal representing that no encoded data has been decoded, outputs to the interpolation unit 931 a signal representing that no corresponding sub-block SB( ) exists.

In this fashion, the interpolation unit 931 receives the sub-block information SB( ). If the interpolation unit 931 has not received four pieces of sub-block information, it interpolates omitted sub-block information based on existent sub-block information. For example, when the sub-block SB(3) is omitted, the interpolation unit 931 interpolates an element of identification information at each pixel position in the omitted sub-block SB(3) on the basis of existent surrounding identification information. As a simple example, when the number of pieces of existent position information around an omission position is N and more than half of these pieces of position information are "1", identification information at the omission position is set to "1". When less than half of these pieces of position information are "1", the identification information is set to "0".

Generally in a character-line image, black pixels forming the character-line image run. Thus, the above-mentioned interpolation can restore omitted difference information at high probability.

The embodiments according to the present invention have been described. The functions of the processing units of each apparatus and the entire processing sequence described in the embodiments may also be implemented by a computer program executed in a general-purpose information processing apparatus such as a personal computer. For example, in the encoding apparatus shown in FIG. 1A, the processing units 101 to 105 suffice to perform processes as subroutines or functions in the computer program, and repeat them by the number of blocks included in an image to be encoded.

A computer program is generally stored in a computer-readable storage medium such as a CD-ROM. The computer-readable storage medium is set in a reader (e.g., CD-ROM drive) to copy or install the computer program in a system, thereby executing the computer program. As a matter of course, this computer-readable storage medium also falls within the scope of the present invention.

Third to Fifth Embodiments

The third to fifth embodiments according to the present invention will be described with reference to the accompanying drawings. Image data to be encoded in the following embodiments is binary image data. Note that the binary image is not only an image in which, for example, pixel values are 0 and 1. The embodiments can also be applied to even a case where, for example, the appearance densities of 8-bit pixel values are two, 50 and 150.

Third Embodiment

Figure 10:
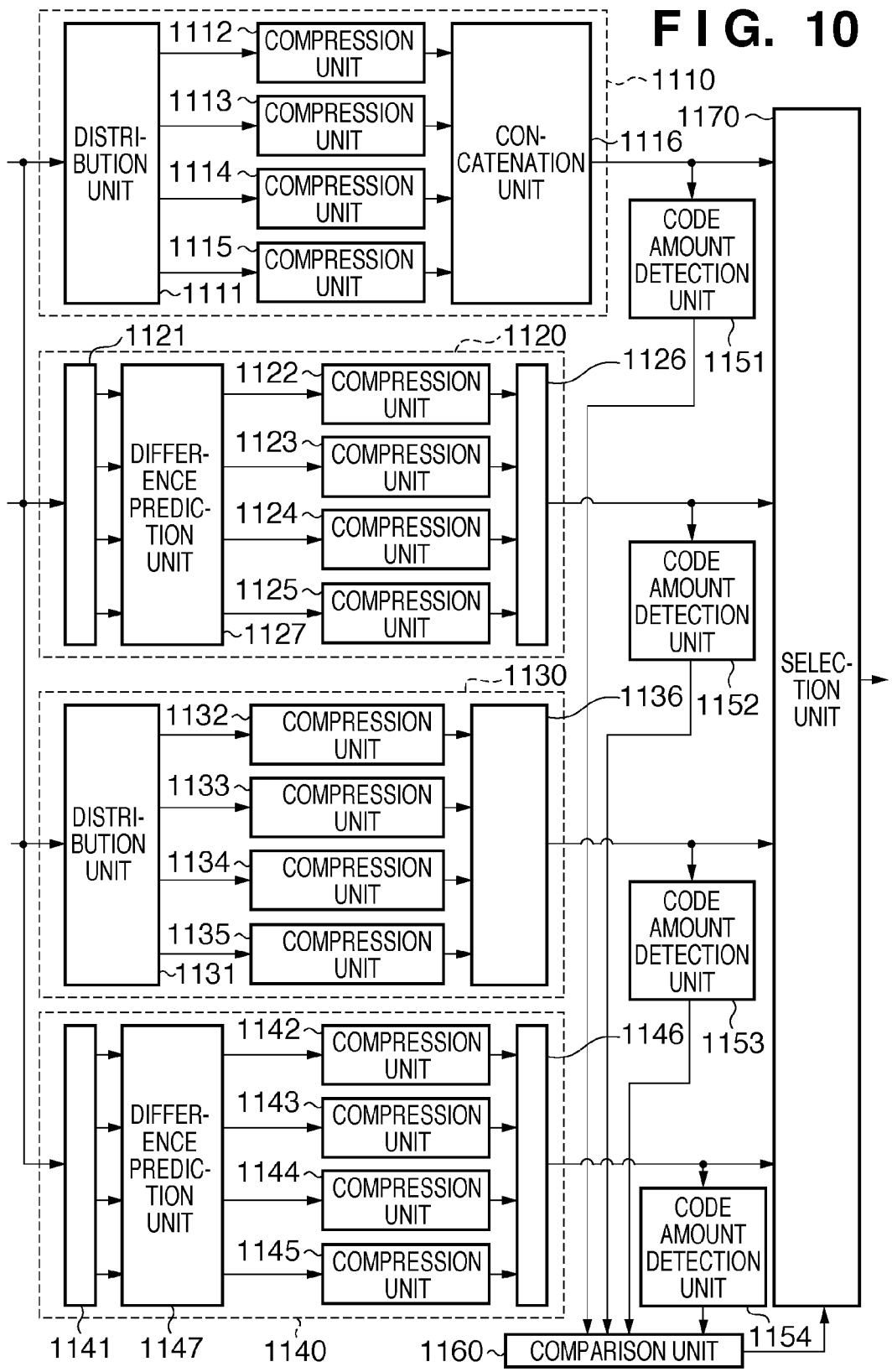
FIG. 10 is a block diagram of the arrangement of an image encoding apparatus in the third embodiment.

FIG. 10 is a block diagram of the arrangement of a lossless image encoding apparatus in the third embodiment.

The lossless image encoding apparatus comprises encoding units 1110, 1120, 1130, and 1140, code amount detection units 1151 to 1154 which detect code amounts from the encoding units 1110 to 1140, a comparison unit 1160, and a selection unit 1170.

The encoding units 1110, 1120, 1130, and 1140 encode an input 16×16-pixel block, and output the generated encoded data to the selection unit 1170 (details of which will be described later). The code amount detection units 1151 to 1154 detect the data amounts of respective encoded data, and output the detection results to the comparison unit 1160. The comparison unit 1160 compares the amounts of code from the code amount detection units 1151 to 1154, determines the minimum amount of code, and outputs the determination result as a control signal to the selection unit 1170. In accordance with the control signal from the comparison unit 1160, the selection unit 1170 selects and outputs encoded data from one of the encoding units 1110, 1120, 1130, and 1140. At this time, the selection unit 1170 adds, to the header of the selected encoded data, identification information representing an encoding unit whose encoded data has been selected, and outputs the identification information. In the third embodiment, there are four encoding units, so the identification information is sufficiently formed from two bits. Note that two encoded data out of encoded data generated by the encoding units 1110, 1120, 1130, and 1140 may also exhibit the minimum amount of data. In this case, one encoded data is determined to be selected in the order of the encoding units 1110, 1120, 1130, and 1140.

The encoding units 1110, 1120, 1130, and 1140 will be explained.

The encoding unit 1110 comprises a distribution unit 1111, compression units 1112 to 1115, and a concatenation unit 1116.

By looking up a table in FIG. 12A, the distribution unit 1111 distributes pixel data of an input 16×16-pixel block to one of four 8×8-pixel sub-blocks. More specifically, the distribution unit 1111 distributes pixel data as follows.

The distribution unit 1111 determines pixel data at positions represented by "0" in FIG. 12A as an 8×8-pixel sub-block (to be referred to as a sub-block SB0 hereinafter), and outputs (distributes) the sub-block SB0 to the compression unit 1112.

Similarly, the distribution unit 1111 determines pixel data at positions represented by "1" in FIG. 12A as a sub-block SB1, and outputs the sub-block SB1 to the compression unit 1113. The distribution unit 1111 determines pixel data at positions represented by "2" in FIG. 12A as a sub-block SB2, and outputs the sub-block SB2 to the compression unit 1114. The distribution unit 1111 determines pixel data at positions represented by "3" in FIG. 12A as a sub-block SB3, and outputs the sub-block SB3 to the compression unit 1115.

This will be described more simply. The pixel value at the coordinates (x,y) in an input 16×16-pixel block is defined as B(x,y). The pixel values at the coordinates (x,y) in the sub-blocks SB0, SB1, SB2, and SB3 are defined as $SB0(x,y)$, $SB1(x,y)$, $SB2(x,y)$, and $SB3(x,y)$. In this case, the distribution unit 1111 distributes respective pixel data in an input block image B into the four sub-blocks SB0, SB1, SB2, and SB3:

$$SB0(x,y) \leftarrow B(2x,2y)$$

$$SB1(x,y) \leftarrow B(2x+1,2y)$$

$$SB2(x,y) \leftarrow B(2x,2y+1)$$

$$SB3(x,y) \leftarrow B(2x+1,2y+1) \qquad (1)$$

where x and y are integers of 0 to 7.

In short, assume that the pixel block has a size of M×N pixels and is distributed to K (=p×q) sub-blocks. In this case, the distribution unit 1111 distributes pixel data at the coordinates (x,y) in the pixel block to a sub-block represented by a remainder obtained when dividing the x-coordinate by p and a remainder obtained when dividing the y-coordinate by q.

The compression units 1112 to 1115 compression-encode the sub-blocks SB0 to SB3 respectively supplied to them, and output the compression-encoded sub-blocks to the concatenation unit 1116. The compression encoding algorithm of the compression unit is arbitrary. In the third embodiment, the compression unit scans a sub-block to obtain the run, and generates a run code word in accordance with the Huffman code table (variable-length lossless encoding). The concatenation unit 1116 concatenates the encoded data of the respective sub-blocks in a preset order, for example, the order of the sub-blocks SB0, SB1, SB2, and SB3, and outputs the concatenated encoded data to the selection unit 1170 and code amount detection unit 1151.

The encoding unit 1120 will be explained. A distribution unit 1121, compression units 1122 to 1125, and a concatenation unit 1126 in the encoding unit 1120 are identical to the distribution unit 1111, compression units 1112 to 1115, and concatenation unit 1116 in the encoding unit 1110. The encoding unit 1120 is different from the encoding unit 1110 in that a difference prediction unit 1127 is arranged. Hence, the difference prediction unit 1127 will be described.

The difference prediction unit 1127 directly outputs one of K sub-blocks input from the distribution unit 1121 without processing it. The difference prediction unit 1127 sets this sub-block as a reference, calculates predicted difference values of the (K−1) remaining sub-blocks from the reference, and outputs the calculation results.

More specifically, the difference prediction unit 1127 in the third embodiment directly outputs the sub-block SB0 input from the distribution unit 1121 to the compression unit 1122. The difference prediction unit 1127 sets the sub-block SB0 as a reference. The difference prediction unit 1127 exclusive-ORs the sub-block SB0 serving as a reference and the three remaining sub-blocks SB1, SB2, and SB3 for pixels at the identical pixel positions. The difference prediction unit 1127 outputs the exclusive-OR results as SB1', SB2', and SB3' to the compression units 1123 to 1125:

$$SB1' \leftarrow XOR\{SB0(x,y), SB1(x,y)\}$$

$$SB2' \leftarrow XOR\{SB0(x,y), SB2(x,y)\}$$

$$SB3' \leftarrow XOR\{SB0(x,y), SB3(x,y)\} \qquad (2)$$

where XOR{a,b} is the exclusive OR of the bits of the values a and b.

The encoding unit 1120 concatenates the encoded data of the sub-blocks SB0, SB1', SB2', and SB3', and outputs the concatenated encoded data.

In short, the difference between the encoding units 1110 and 1120 is that the encoding unit 1110 encodes a sub-block before the logical operation, whereas the encoding unit 1120 encodes a sub-block after the logical operation.

The encoding unit 1130 will be explained. Compression units 1132 to 1135 and a concatenation unit 1136 in the encoding unit 1130 are identical to the compression units 1112 to 1115 and the concatenation unit 1116 in the encoding unit 1110. The encoding unit 1130 is different from the encoding unit 1110 in distribution by a distribution unit 1131. Therefore, the distribution unit 1131 will be described.

The distribution unit 1131 determines pixel data at positions represented by "0" in FIG. 12B as a sub-block SB0, and outputs the sub-block SB0 to the compression unit 1132.

Similarly, the distribution unit 1131 determines pixel data at positions represented by "1" in FIG. 12B as a sub-block SB1, and outputs the sub-block SB1 to the compression unit 1133. The distribution unit 1131 determines pixel data at positions represented by "2" in FIG. 12B as a sub-block SB2, and outputs the sub-block SB2 to the compression unit 1134. The distribution unit 1131 determines pixel data at positions represented by "3" in FIG. 12B as a sub-block SB3, and outputs the sub-block SB3 to the compression unit 1135.

In short, the distribution unit 1131 defines, as a sub-block, each divided region (p×q pixels) obtained by dividing an input pixel block B into p in the horizontal direction and q in the vertical direction. The distribution unit 1131 distributes pixel data of the input pixel block B to each sub-block. Note that p and q are integers of 1 or more, and at least either of them is an integer of 2 or more.

The distribution unit 1131 in the third embodiment divides the input 16×16-pixel block B in half in both the horizontal and vertical directions, building four sub-blocks SB0, SB1, SB2, and SB3. This is given by $$SB0(x,y) \leftarrow B(x,y)$$

$$SB1(x,y) \leftarrow B(x+8,y)$$

$$SB2(x,y) \leftarrow B(x,y+8)$$

$$SB3(x,y) \leftarrow B(x+8,y+8) \quad (3)$$

where x and y are integers of 0 to 7.

The encoding unit 1130 concatenates the encoded data of the sub-blocks SB0, SB1, SB2, and SB3 represented by formulas (3), and outputs the concatenated encoded data.

The encoding unit 1140 will be described. A distribution unit 1141 in the encoding unit 1140 is identical to the distribution unit 1131 in the encoding unit 1130 (see FIG. 12B). Compression units 1142 to 1145, a concatenation unit 1146, and a difference prediction unit 1147 in the encoding unit 1140 are identical to the compression units 1122 to 1125, the concatenation unit 1126, and the difference prediction unit 1127 in the encoding unit 1120. Thus, the difference prediction unit 1147 directly outputs the sub-block SB0 to the compression unit 1142. The difference prediction unit 1147 calculates sub-blocks SB1', SB2', and SB3' for the remaining sub-blocks SB1, SB2, and SB3 in accordance with the following formulas (4), and outputs the sub-blocks SB1', SB2', and SB3' to the compression units 1143 to 1145:

$$SB1' \leftarrow \text{XOR}\{SB0(x,y),SB1(x,y)\}$$

$$SB2' \leftarrow \text{XOR}\{SB0(x,y),SB2(x,y)\}$$

$$SB3' \leftarrow \text{XOR}\{SB0(x,y),SB3(x,y)\} \quad (4)$$

Formulas (4) are the same as formulas (2) described above. However, the sub-blocks SB1, SB2, and SB3 in formulas (4) are the results of formulas (3).

The encoding units 1110, 1120, 1130, and 1140 have been explained.

As described above, the encoding units output generated encoded data to the selection unit 1170, and also output them to the corresponding code amount detection units 1151, 1152, 1153, and 1154. The selection unit 1170 selects and outputs encoded data having the smallest data amount from the four encoded data. At this time, the selection unit 1170 stores, in the header, identification information (two bits because there are four encoded data in the third embodiment) representing an encoding unit whose encoded data has been selected. That is, encoded data of the 16×16-pixel block B output from the selection unit 1170 has a format as shown in FIG. 13. As shown in FIG. 13, identification information is set as the header, and accompanied by encoded data of the sub-block SB0, that of the sub-block SB1 or SB1', that of the sub-block SB2 or SB2', and that of the sub-block SB3 or SB3'.

The image encoding apparatus in the third embodiment has been described. Next, the image decoding apparatus in the third embodiment will be explained. The reference numerals in the following description are the same as those of the encoding apparatus, and a description thereof will not be repeated.

Figure 11:
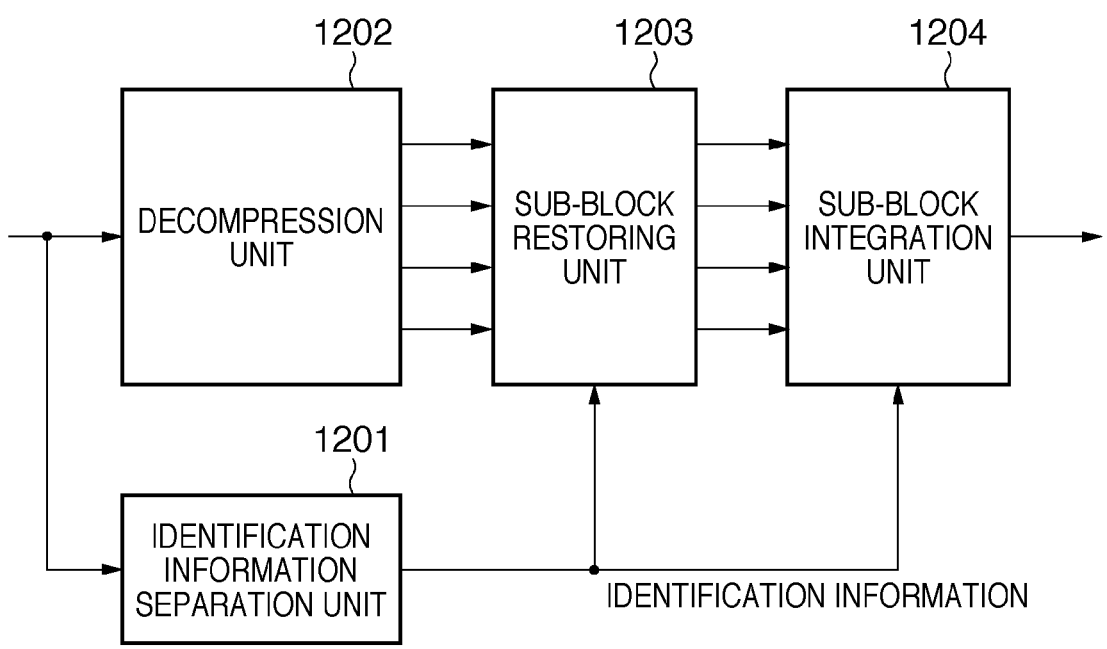
FIG. 11 is a block diagram of the arrangement of an image decoding apparatus in the third embodiment.
Figure 15A:
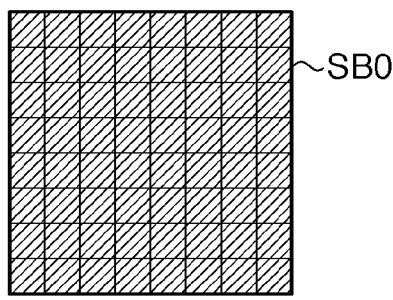
FIGS. 15A to 15D are views showing sub-blocks encoded by an encoding unit 1110 in the apparatus in the third embodiment.
Figure 15B:
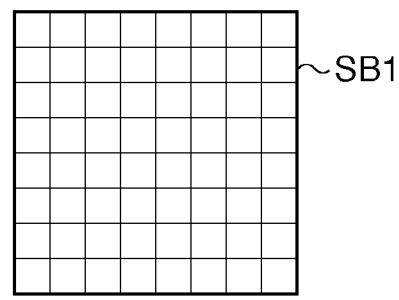
Figure 15C:
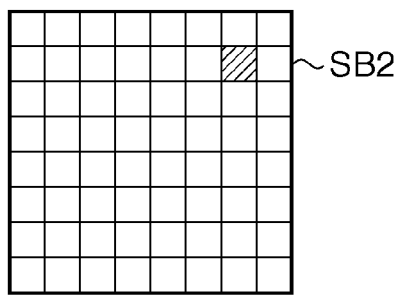
Figure 15D:
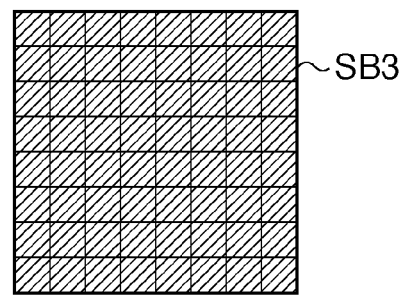
Figure 16A:
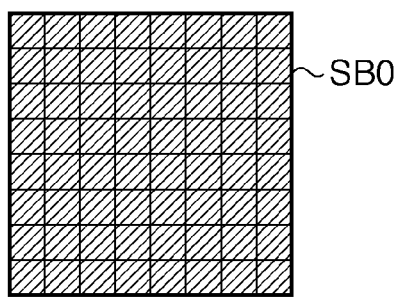
FIGS. 16A to 16D are views showing sub-blocks encoded by an encoding unit 1120 in the apparatus in the third embodiment.
Figure 16B:
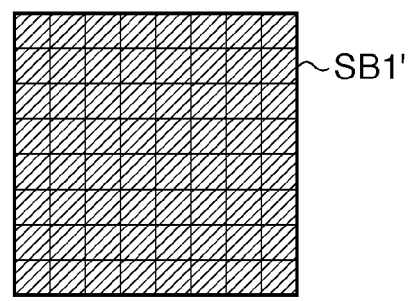
Figure 16C:
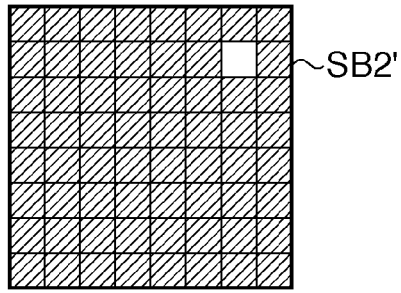
Figure 16D:
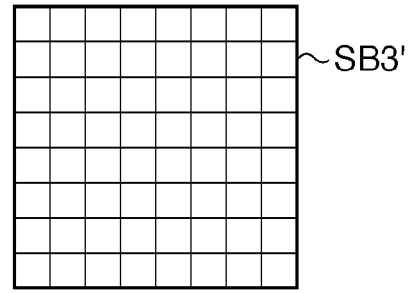
Figure 17A:
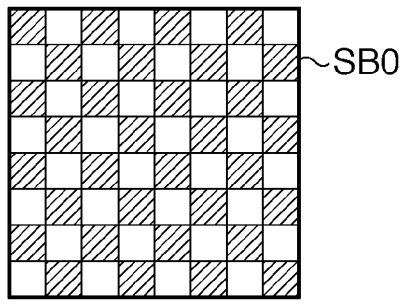
FIGS. 17A to 17D are views showing sub-blocks encoded by an encoding unit 1130 in the apparatus in the third embodiment.
Figure 17B:
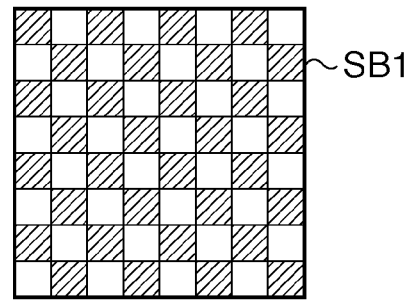
Figure 17C:
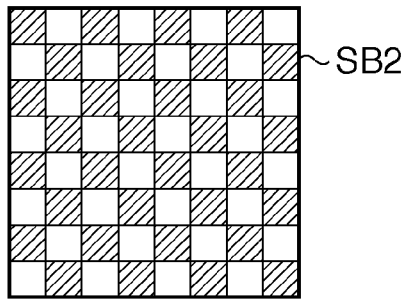
Figure 17D:
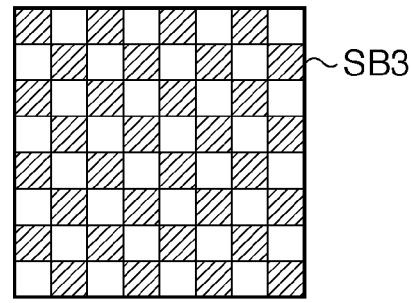
Figure 18A:
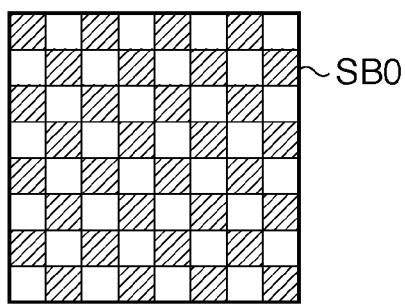
FIGS. 18A to 18D are views showing sub-blocks encoded by an encoding unit 1140 in the apparatus in the third embodiment.
Figure 18B:
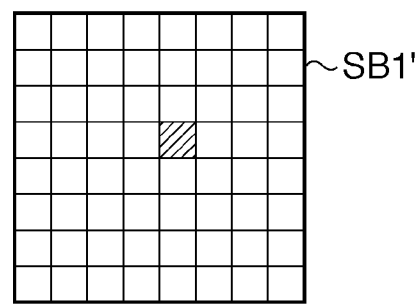
Figure 18C:
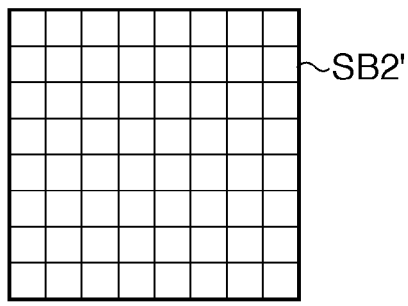
Figure 18D:
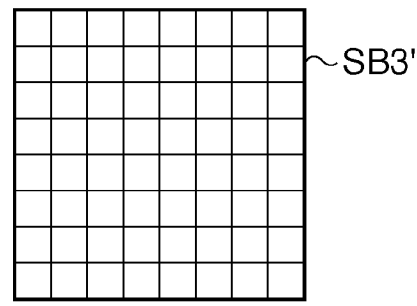
Figure 19A:
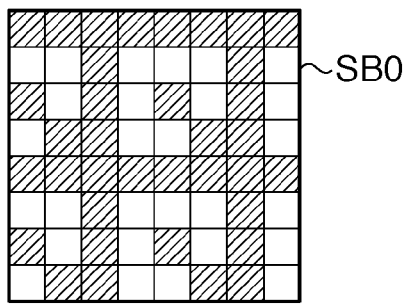
FIGS. 19A to 19D are views showing sub-blocks encoded by the encoding unit 1110 in the apparatus in the third embodiment.
Figure 19B:
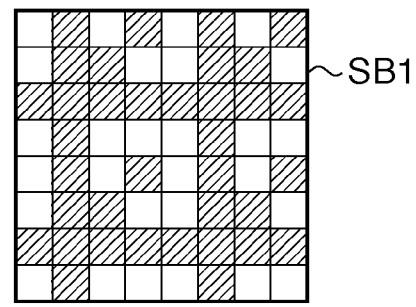
Figure 19C:
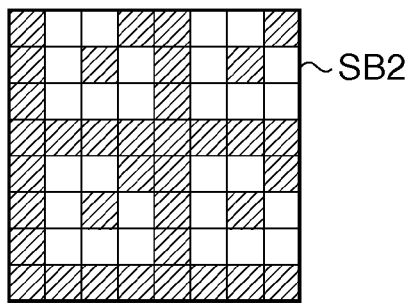
Figure 19D:
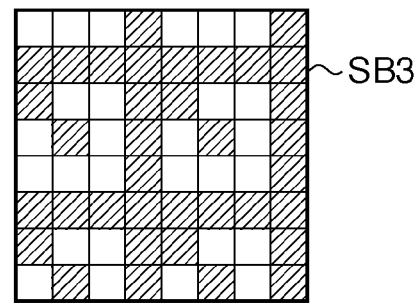
Figure 20A:
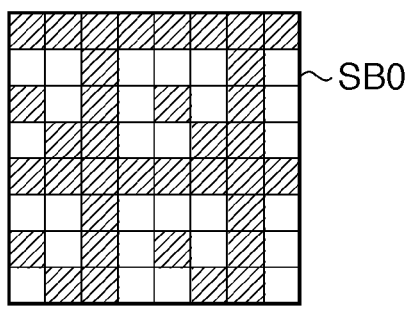
FIGS. 20A to 20D are views showing sub-blocks encoded by the encoding unit 1120 in the apparatus in the third embodiment.
Figure 20B:
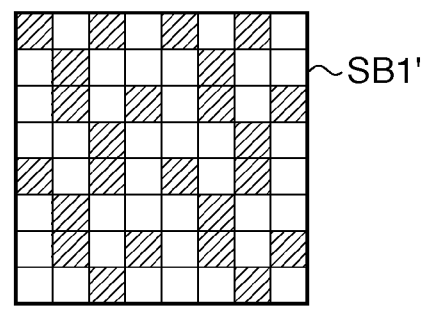
Figure 20C:
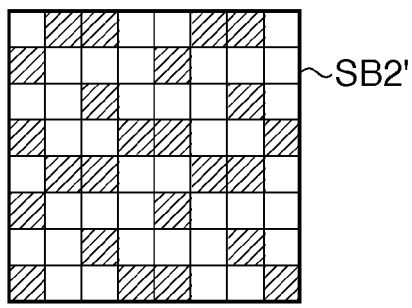
Figure 20D:
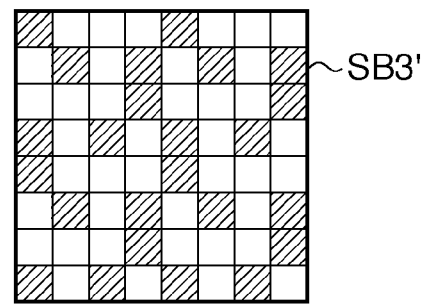
Figure 21A:
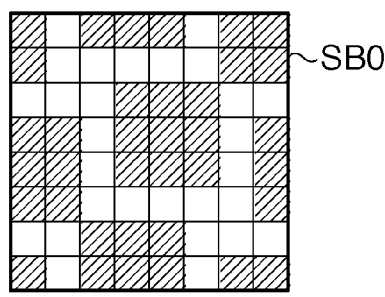
FIGS. 21A to 21D are views showing sub-blocks encoded by the encoding unit 1130 in the apparatus in the third embodiment.
Figure 21B:
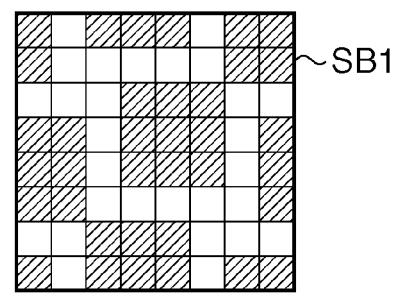
Figure 21C:
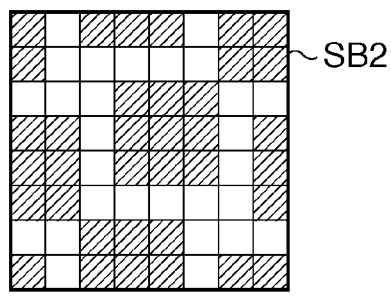
Figure 21D:
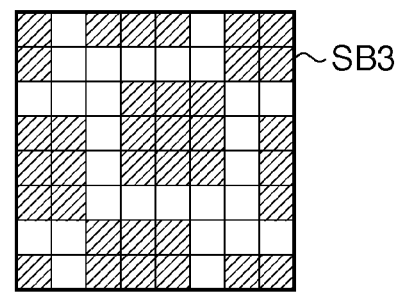
Figure 22A:
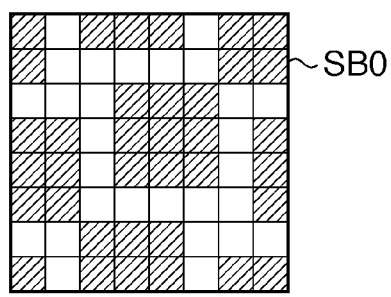
FIGS. 22A to 22D are views showing sub-blocks encoded by the encoding unit 1140 in the apparatus in the third embodiment.
Figure 22B:
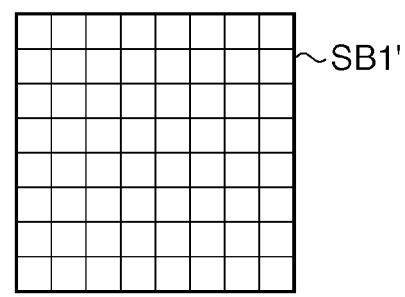
Figure 22C:
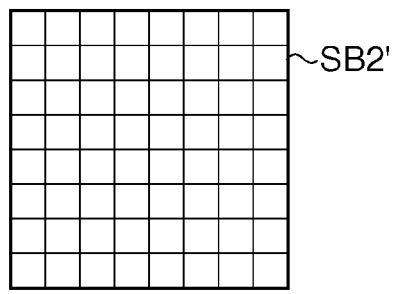
Figure 22D:
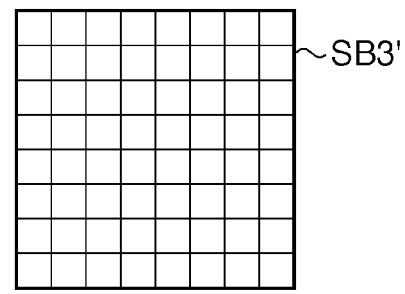

FIG. 11 is a block diagram of the arrangement of the image decoding apparatus. The image decoding apparatus comprises an identification information separation unit 1201, decompression unit 1202, sub-block restoring unit 1203, and sub-block integration unit 1204.

When encoded data is input to the image decoding apparatus, the identification information separation unit 1201 separates and extracts identification information (two bits) from the header of the encoded data, and outputs it to the sub-block restoring unit 1203 and sub-block integration unit 1204.

The decompression unit 1202 receives encoded data following the identification information, decompresses (decodes) them to generate {SB0, SB1, SB2, SB3} or {SB0, SB1', SB2', SB3'}, and outputs them to the sub-block restoring unit 1203.

When the identification information represents that the data have been encoded by either the encoding unit 1110 or 1130, the received data are {SB0, SB1, SB2, SB3}. In this case, the sub-block restoring unit 1203 directly outputs the received data to the sub-block integration unit 1204.

When the identification information represents that the data have been encoded by either the encoding unit 1120 or 1140, the data received from the decompression unit 1202 are {SB0, SB1', SB2', SB3'}. In this case, the sub-block restoring unit 1203 directly outputs the sub-block SB0 to the sub-block integration unit 1204. The sub-block restoring unit 1203 restores the sub-blocks SB1, SB2, and SB3 from the remaining sub-blocks SB1', SB2', and SB3':

$$SB1 \leftarrow \text{XOR}\{SB0(x,y),SB1'(x,y)\}$$

$$SB2 \leftarrow \text{XOR}\{SB0(x,y),SB2'(x,y)\}$$

$$SB3 \leftarrow \text{XOR}\{SB0(x,y),SB3'(x,y)\} \quad (5)$$

The sub-block integration unit 1204 receives the sub-blocks SB0, SB1, SB2, and SB3 from the sub-block restoring unit 1203, and builds the 16×16-pixel block B on the basis of the identification information. Details of this process are as follows.

Assume that the identification information represents that the data have been encoded by either the encoding unit 1130 or 1140. In this case, the sub-block integration unit 1204 simply integrates the sub-blocks SB0, SB1, SB2, and SB3 into a format shown in FIG. 12B, that is, integrates the pixels of the 16×16-pixel block B in accordance with the following formulas, and outputs the 16×16-pixel block B:

$$B(x,y) \leftarrow SB0(x,y)$$

$$B(x+8,y) \leftarrow SB1(x,y)$$

$$B(x,y+8) \leftarrow SB2(x,y)$$

$$B(x+8,y+8) \leftarrow SB3(x,y)$$

where x and y are integers of 0 to 7.

Assume that the identification information represents that the data have been encoded by either the encoding unit 1110 or 1120. In this case, the sub-block integration unit 1204 integrates the sub-blocks SB0, SB1, SB2, and SB3 into a format shown in FIG. 12A, and outputs the integrated sub-blocks as the 16×16-pixel block B. More specifically, the sub-block integration unit 1204 integrates the sub-blocks SB0, SB1, SB2, and SB3 by $$B(2x,2y) \leftarrow SB0(x,y)$$

$$B(2x+1,2y) \leftarrow SB1(x,y)$$

$$B(2x,2y+1) \leftarrow SB2(x,y)$$

$$B(2x+1,2y+1) \leftarrow SB3(x,y)$$

where x and y are integers of 0 to 7.

As a result, target image data can be efficiently encoded, and an image can be restored from the encoded data.

Assume that a 16×16-pixel block in image data to be encoded is an image shown in FIG. 14A. In this case, the sub-blocks {SB0, SB1, SB2, SB3} or {SB0, SB1', SB2', SB3'} input to the compression units 1112 to 1115, 1122 to 1125, 1132 to 1135, and 1142 to 1145 in the encoding units 1110, 1120, 1130, and 1140 of the image encoding apparatus are those shown in FIGS. 15A to 18D.

FIGS. 15A to 15D show sub-blocks SB0, SB1, SB2, and SB3 supplied to the compression units 1112 to 1115 in the encoding unit 1110. FIGS. 16A to 16D show sub-blocks SB0, SB1', SB2', and SB3' supplied to the compression units 1122 to 1125 in the encoding unit 1120. FIGS. 17A to 17D show sub-blocks SB0, SB1, SB2, and SB3 supplied to the compression units 1132 to 1135 in the encoding unit 1130. FIGS. 18A to 18D show sub-blocks SB0, SB1', SB2', and SB3' supplied to the compression units 1142 to 1145 in the encoding unit 1140. Note that the supplied sub-blocks in FIGS. 16A to 16D and 18A to 18D are not the sub-blocks SB1, SB2, and SB3, but the sub-blocks SB1', SB2', and SB3'.

In the image of FIG. 14A, the run length is long in FIGS. 15A to 15D and 16A to 16D. That is, finally selected encoded data are those generated by the encoding unit 1110 or 1120.

Assume that a 16×16-pixel block in image data to be encoded is an image shown in FIG. 14B. In this case, the sub-blocks {SB0, SB1, SB2, SB3} or {SB0, SB1', SB2', SB3'} respectively input to the four compression units in each of the encoding units 1110, 1120, 1130, and 1140 of the image encoding apparatus are those shown in FIGS. 19A to 22D.

FIGS. 19A to 19D show sub-blocks SB0, SB1, SB2, and SB3 supplied to the compression units 1112 to 1115 in the encoding unit 1110. FIGS. 20A to 20D show sub-blocks SB0, SB1', SB2', and SB3' supplied to the compression units 1122 to 1125 in the encoding unit 1120. FIGS. 21A to 21D show sub-blocks SB0, SB1, SB2, and SB3 supplied to the compression units 1132 to 1135 in the encoding unit 1130. FIGS. 22A to 22D show sub-blocks SB0, SB1', SB2', and SB3' supplied to the compression units 1142 to 1145 in the encoding unit 1140. Note that the supplied sub-blocks in FIGS. 20A to 20D and 22A to 22D are not the sub-blocks SB1, SB2, and SB3, but the sub-blocks SB1', SB2', and SB3'.

In the image of FIG. 14B, the run length is long in FIGS. 22A to 22D. That is, finally selected encoded data are those generated by the encoding unit 1140.

The third embodiment has described two examples (FIGS. 12A and 12B) of distributing the pixels of a 16×16-pixel blocks to four 8×8-pixel sub-blocks. However, the number of distribution examples is arbitrary such as three or more. In short, a plurality of algorithms suffice to be employed to distribute pixel data of an M×N-pixel block to K sub-blocks each storing 1/K (K is an integer of 2 or more) of the number of pixels included in the pixel block. For example, letting i (i=0 to 15) be a line number in a 16×16-pixel block, and j be a remainder when dividing i by 4, image data of the ith line may also be distributed to a sub-block SB(j).

In the above description, each encoding unit has a distribution unit, but some distribution units can also be omitted. For example, since the distribution units 1111 and 1121 in the encoding units 1110 and 1120 are identical, it is also possible to omit the distribution unit 1121 in the encoding unit 1120 and connect the difference prediction unit 1127 to the distribution unit 1111 in the encoding unit 1110.

Fourth Embodiment

The fourth embodiment according to the present invention will be described.

In the third embodiment, pixel data in a pixel block to be encoded are encoded by distributing them to K sub-blocks SB(0) to SB(K−1) each made up of 1/K of the number of pixels included in the pixel block. The fourth embodiment further adds an arrangement to distribute pixel data in a single pixel block to J sub-blocks SB(0) to SB(J−1) each made up of 1/J of the number of pixels included in the pixel block. In this case, J is an integer of 2 or more, and J≠K. The feature of the fourth embodiment is to adopt the first and second distribution methods using different sub-block sizes.

Figure 23:
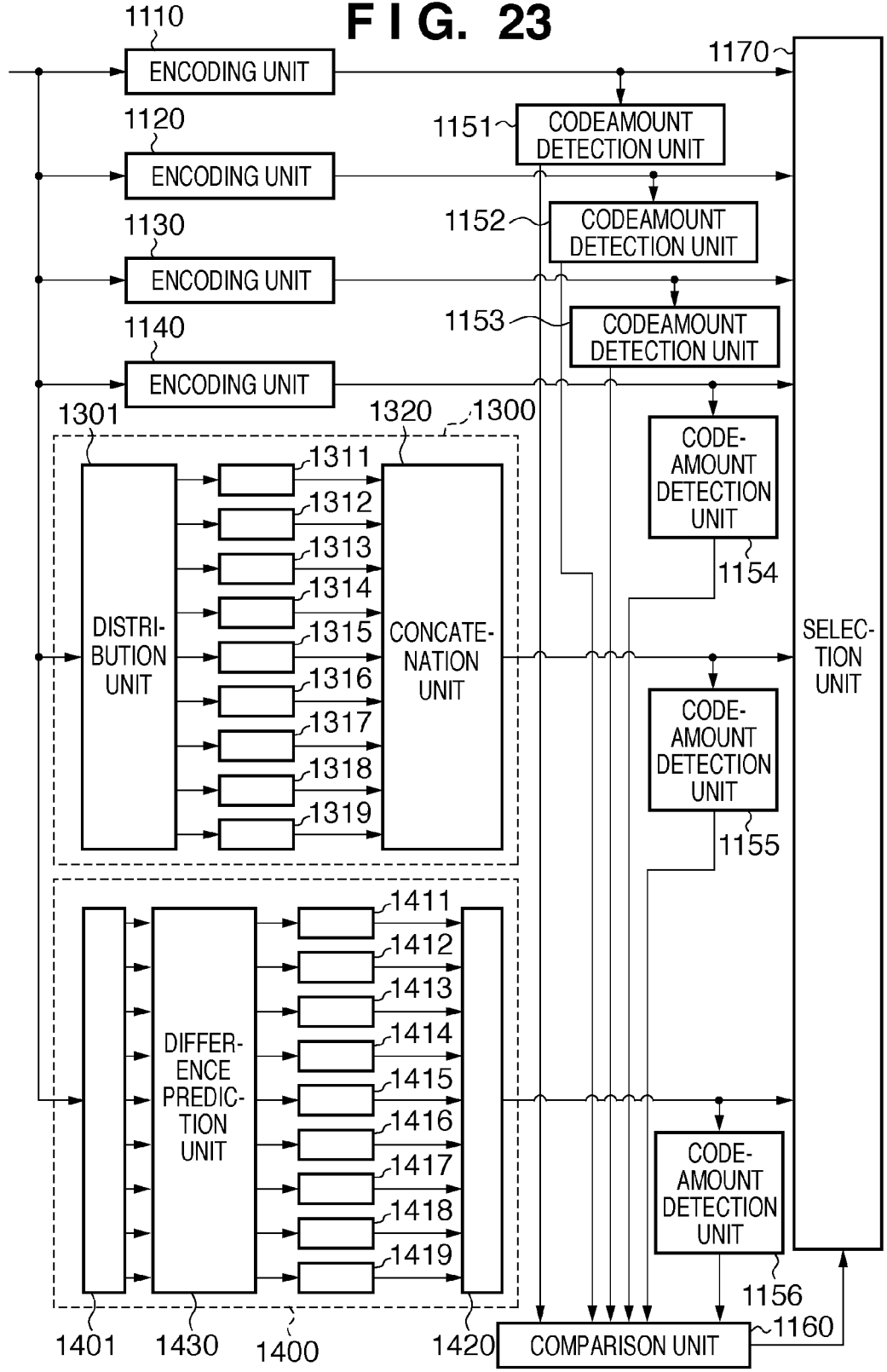
FIG. 23 is a block diagram of the arrangement of an image encoding apparatus in the fourth embodiment.

FIG. 23 is a block diagram of the arrangement of an image encoding apparatus in the fourth embodiment. The same reference numerals as those in FIG. 10 denote the same parts, and a description thereof will not be repeated (see FIG. 1 for details).

In FIG. 23, encoding units 1300 and 1400, and code amount detection units 1155 and 1156 are added to the arrangement in FIG. 10.

In the third embodiment, the pixel block to be encoded has a size of 16×16 pixels. In the fourth embodiment, the pixel block to be encoded has a size of 12×12 pixels.

Hence, each of sub-blocks in encoding units 1110, 1120, 1130, and 1140 in FIG. 23 has a size of 6×6 pixels.

Figures 24A, 24B, 24C:
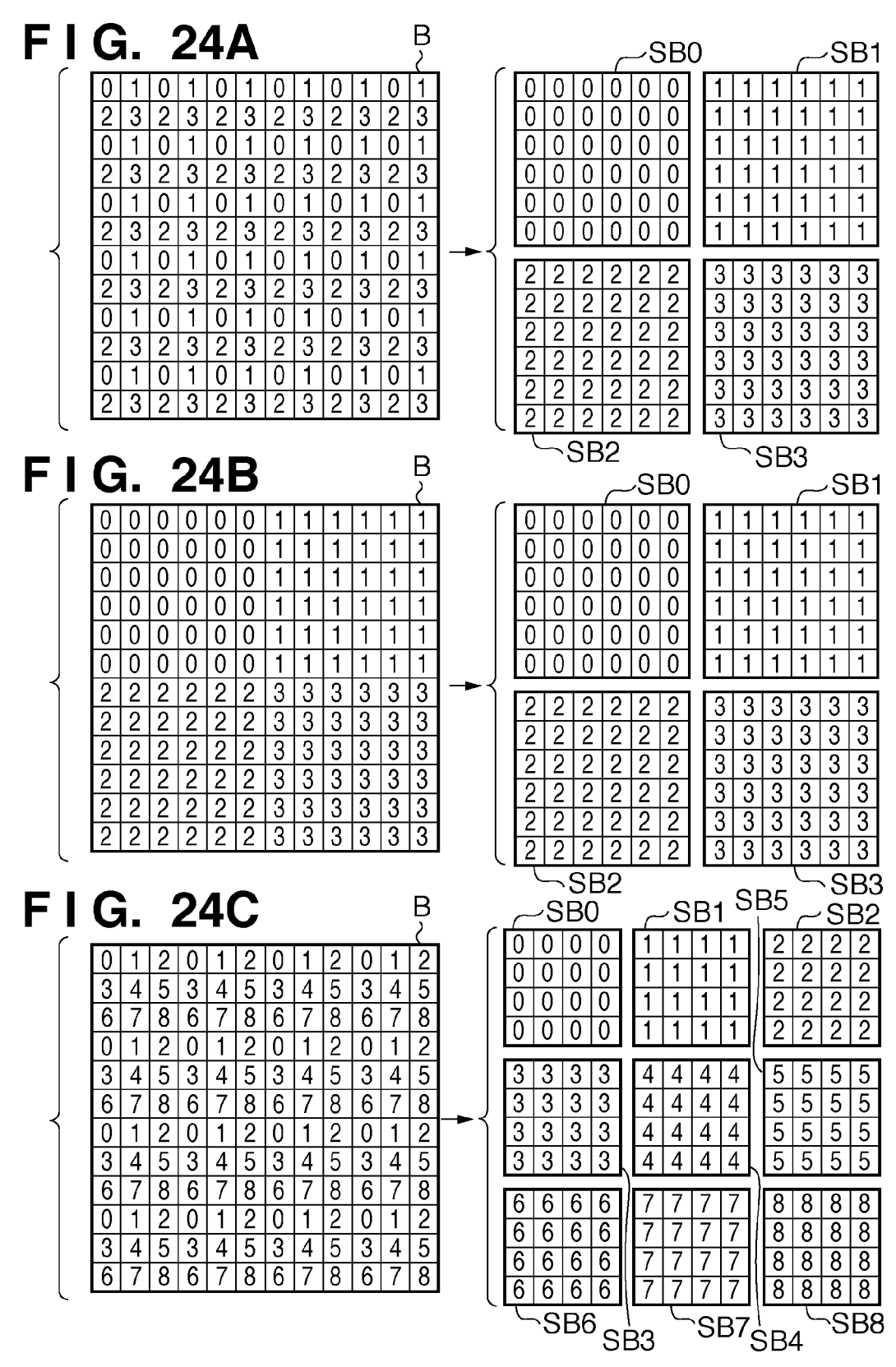

More specifically, a distribution unit 1111 in the encoding unit 1110 according to the fourth embodiment distributes pixel data "0" in a 12×12-pixel block B to a 6×6-pixel sub-block SB0, generating the sub-block SB0, as shown in FIG. 24A. The distribution unit 1111 generates sub-blocks SB1, SB2, and SB3 in the same way. The encoding unit 1110 concatenates the encoded data of the sub-blocks SB0, SB1, SB2, and SB3, and outputs the concatenated encoded data to a selection unit 1170.

The encoding unit 1120 executes almost the same process as that in the encoding unit 1110. The encoding unit 1120 generates encoded data of sub-blocks SB0, SB1', SB2', and SB3', concatenates them, and outputs the concatenated encoded data.

A distribution unit 1131 in the encoding unit 1130 (also a distribution unit 1141 in the encoding unit 1140) according to the fourth embodiment distributes pixel data "0" in the 12×12-pixel block B to a 6×6-pixel sub-block SB0, as shown in FIG. 24B. The distribution unit 1131 generates sub-blocks SB1, SB2, and SB3 in the same way. The encoding unit 1130 concatenates the encoded data of the sub-blocks SB0, SB1, SB2, and SB3, and outputs the concatenated encoded data to the selection unit 1170.

The encoding unit 1140 executes almost the same process as that in the encoding unit 1130. The encoding unit 1140 generates encoded data of sub-blocks SB0, SB1', SB2', and SB3', concatenates them, and outputs the concatenated encoded data.

Since the size of a sub-block compression-encoded by each compression unit in each of the encoding units 1110, 1120, 1130, and 1140 in the fourth embodiment is different from that in the third embodiment, a Huffman code table different from that in the third embodiment is desirably used. This also applies to the encoding units 1300 and 1400 to be described later.

The encoding units 1300 and 1400 newly added in the fourth embodiment will be explained.

As shown in FIG. 23, the encoding unit 1300 comprises a distribution unit 1301, compression units 1311 to 1319, and a concatenation unit 1320.

The distribution unit 1301 distributes each pixel data in an input 12×12-pixel block B to one of nine 4×4-pixel sub-blocks SB0 to SB8. The distribution unit 1301 supplies the generated sub-blocks SB0 to SB8 to the compression units 1311 to 1319. FIG. 24C shows the correspondence between the pixel block B and the sub-blocks SB0 to SB8. This correspondence is given by $$SB0(x,y) \leftarrow B(3x,3y)$$

$$SB1(x,y) \leftarrow B(3x+1,3y)$$

$$SB2(x,y) \leftarrow B(3x+2,3y)$$

$$SB3(x,y) \leftarrow B(3x,3y+1)$$

$$SB4(x,y) \leftarrow B(3x+1,3y+1)$$

$$SB5(x,y) \leftarrow B(3x+2,3y+1)$$

$$SB6(x,y) \leftarrow B(3x,3y+2)$$

$$SB7(x,y) \leftarrow B(3x+1,3y+2)$$

$$SB8(x,y) \leftarrow B(3x+2,3y+2) \quad (6)$$

where x and y are integers of 0 to 3.

The compression units 1311 to 1319 encode the sub-blocks SB0 to SB8 generated in this manner, and output them to the concatenation unit 1320. The concatenation unit 1320 concatenates the encoded data of the sub-blocks SB0 to SB8 in the order named, and outputs the concatenated encoded data to the selection unit 1170 and code amount detection unit 1155.

The encoding unit 1400 will be explained. The encoding unit 1400 comprises a distribution unit 1401, compression units 1411 to 1419, a concatenation unit 1420, and a difference prediction unit 1430. Of these units, the distribution unit 1401, compression units 1411 to 1419, and concatenation unit 1420 have the same functions as those of the distribution unit 1301, compression units 1311 to 1319, and concatenation unit 1320 in the encoding unit 1300, and a description thereof will not be repeated. The difference prediction unit 1430 will be explained.

The difference prediction unit 1430 makes one of the nine sub-blocks SB0 to SB8 pass through it. The difference prediction unit 1430 calculates the differences between this sub-block and the eight remaining sub-blocks, and outputs the differences. More specifically, the difference prediction unit 1430 directly outputs the sub-block SB0 generated by the distribution unit 1401 to the compression unit 1411. For the remaining sub-blocks SB1 to SB8, the difference prediction unit 1430 calculates differences from the sub-block SB0 in accordance with the following formulas, and outputs the differences as sub-block SB1' to SB8' to the compression units 1412 to 1419:

$$SB1'(x,y) \leftarrow XOR\{SB0(x,y),SB1(x,y)\}$$

$$SB2'(x,y) \leftarrow XOR\{SB0(x,y),SB2(x,y)\}$$

$$SB3'(x,y) \leftarrow XOR\{SB0(x,y),SB3(x,y)\}$$

$$SB4'(x,y) \leftarrow XOR\{SB0(x,y),SB4(x,y)\}$$

$$SB5'(x,y) \leftarrow XOR\{SB0(x,y),SB5(x,y)\}$$

$$SB6'(x,y) \leftarrow XOR\{SB0(x,y),SB6(x,y)\}$$

$$SB7'(x,y) \leftarrow XOR\{SB0(x,y),SB7(x,y)\}$$

$$SB8'(x,y) \leftarrow XOR\{SB0(x,y),SB8(x,y)\}$$

The compression unit 1411 compression-encodes the sub-block SB0, generating encoded data. The compression units 1412 to 1419 encode the sub-blocks SB1' to SB8', generating encoded data. The concatenation unit 1420 concatenates the encoded data of the sub-block SB0 and those of the sub-blocks SB1' to SB8' in the order named, and outputs the concatenated encoded data to the selection unit 1170 and code amount detection unit 1156.

A comparison unit 1160 compares values representing amounts of code output from code amount detection units 1151 to 1156, and determines the minimum amount of code. Then, the comparison unit 1160 outputs, to the selection unit 1170, a control signal representing an encoding unit whose encoded data exhibits the minimum amount of code. The selection unit 1170 selects and outputs one of encoded data from the encoding units 1110, 1120, 1130, 1140, 1300, and 1400 that is specified by the control signal from the comparison unit 1160. At this time, the selection unit 1170 adds, to the header, identification information representing an encoding unit whose encoded data has been selected. In the fourth embodiment, since there are six encoding units, the identification information requires at least three bits.

When the selection unit 1170 selects encoded data from one of the encoding units 1110, 1120, 1130, and 1140, 12×12-pixel encoded data has a data structure as shown in FIG. 25A. When the selection unit 1170 selects encoded data from either the encoding unit 1300 or 1400, 12×12-pixel encoded data has a data structure as shown in FIG. 25B.

The image encoding apparatus in the fourth embodiment has been described. Next, the image decoding apparatus in the fourth embodiment will be explained. The reference numerals in the following description are the same as those of the encoding apparatus, and a description thereof will not be repeated.

Figure 26:
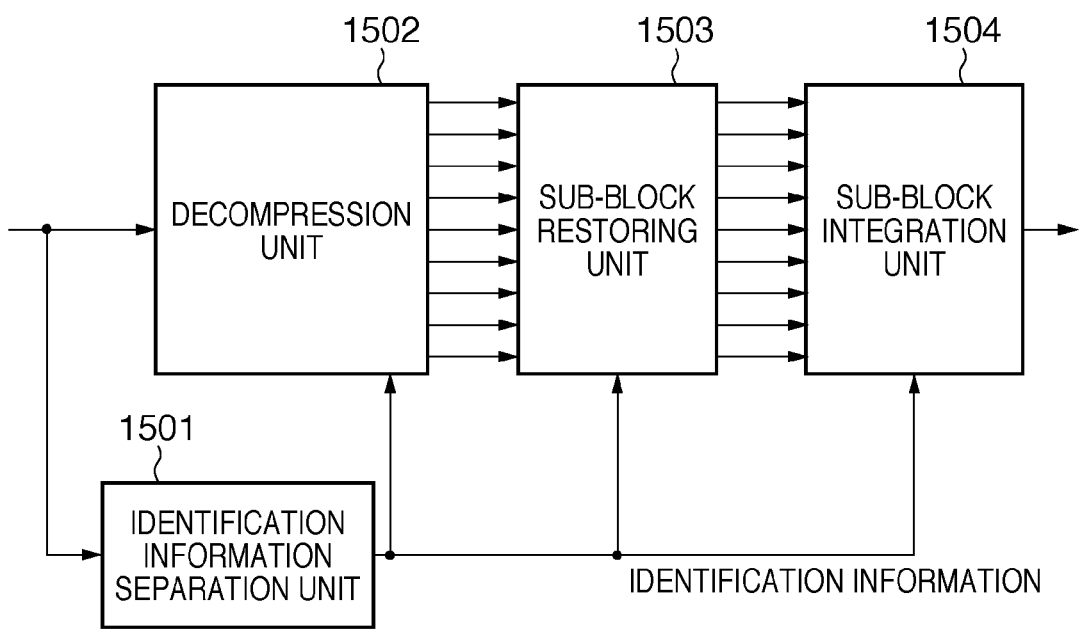
FIG. 26 is a block diagram of the arrangement of an image decoding apparatus in the fourth embodiment.

FIG. 26 is a block diagram of the arrangement of the image decoding apparatus. The image decoding apparatus comprises an identification information separation unit 1501, decompression unit 1502, sub-block restoring unit 1503, and sub-block integration unit 1504.

When encoded data is input to the image decoding apparatus, the identification information separation unit 1501 separates and extracts identification information (three bits) from the header of the encoded data, and outputs it to the decompression unit 1502, sub-block restoring unit 1503, and sub-block integration unit 1504.

Assume that identification information from the identification information separation unit 1501 represents the data structure of encoded data in FIG. 25A. That is, the identification information represents that the encoded data to be decoded have been generated by one of the encoding units 1110, 1120, 1130, and 1140. In this case, encoded data of four sub-blocks follow the identification information, and the decompression unit 1502 decompresses {SB0, SB1, SB2, SB3} or {SB0, SB1', SB2', SB3'}. Then, the decompression unit 1502 outputs the decompression results to the sub-block restoring unit 1503.

Assume that the identification information from the identification information separation unit 1501 represents the data structure of encoded data in FIG. 25B. That is, the identification information represents that the encoded data to be decoded have been generated by either the encoding unit 1300 or 1400. In this case, encoded data of nine sub-blocks follow the identification information. Thus, the decompression unit 1502 decompresses nine sub-blocks {SB0, SB1, SB2, SB3, SB4, SB5, SB6, SB7, SB8} or {SB0, SB1', SB2', SB3', SB4', SB5', SB6', SB7', SB8'}. Then, the decompression unit 1502 outputs the decompression results to the sub-block restoring unit 1503.

Assume that the identification information represents that the data have been encoded by either the encoding unit 1110 or 1130. In this case, the input data are {SB0, SB1, SB2, SB3}, so the sub-block restoring unit 1503 directly outputs them to the sub-block integration unit 1504.

When the identification information represents that the data have been encoded by the encoding unit 1300, the input data are {SB0, SB1, SB2, SB3, SB4, SB5, SB6, SB7, SB8}. Thus, the sub-block restoring unit 1503 directly outputs them to the sub-block integration unit 1504.

When the identification information represents that the data have been encoded by either the encoding unit 1120 or 1140, the input data are {SB0, SB1', SB2', SB3'}. The sub-block restoring unit 1503 builds the sub-blocks SB1, SB2, and SB3 using the sub-block SB0 (see formulas (5) in the third embodiment for details).

When the identification information represents that the data have been encoded by the encoding unit 1400, the input data are {SB0, SB1', SB2', SB3', SB4', SB5', SB6', SB7', SB8'}. The sub-block restoring unit 1503 builds the sub-blocks SB1 to SB8 using the sub-block SB0:

$$SB1 \leftarrow XOR\{SB0(x,y), SB1'(x,y)\}$$

$$SB2 \leftarrow XOR\{SB0(x,y), SB2'(x,y)\}$$

$$SB3 \leftarrow XOR\{SB0(x,y), SB3'(x,y)\}$$

$$SB4 \leftarrow XOR\{SB0(x,y), SB4'(x,y)\}$$

$$SB5 \leftarrow XOR\{SB0(x,y), SB5'(x,y)\}$$

$$SB6 \leftarrow XOR\{SB0(x,y), SB6'(x,y)\}$$

$$SB7 \leftarrow XOR\{SB0(x,y), SB7'(x,y)\}$$

$$SB8 \leftarrow XOR\{SB0(x,y), SB8'(x,y)\} \quad (7)$$

The sub-block integration unit 1504 receives the sub-blocks SB0 to SB3 or the sub-blocks SB0 to SB8 from the sub-block restoring unit 1503, and builds a 12×12-pixel block B based on the identification information.

More specifically, when the identification information represents that the data have been encoded by either the encoding unit 1130 or 1140, the sub-block integration unit 1504 simply integrates the sub-blocks SB0, SB1, SB2, and SB3 into a format shown in FIG. 24B, that is, obtains the pixels of the 12×12-pixel block B in accordance with the following formulas, and outputs the 12×12-pixel block B:

$$B(x,y) \leftarrow SB0(x,y)$$

$$B(x+6,y) \leftarrow SB1(x,y)$$

$$B(x,y+6) \leftarrow SB2(x,y)$$

$$B(x+6,y+6) \leftarrow SB3(x,y)$$

where x and y are integers of 0 to 5.

When the identification information represents that the data have been encoded by either the encoding unit 1110 or 1120, the sub-block integration unit 1504 integrates the sub-blocks SB0, SB1, SB2, and SB3 into a format shown in FIG. 24A, and outputs the integrated sub-blocks as the 12×12-pixel block B. More specifically, the sub-block integration unit 1504 integrates the sub-blocks SB0, SB1, SB2, and SB3 by $$B(2x,2y) \leftarrow SB0(x,y)$$

$$B(2x+1,2y) \leftarrow SB1(x,y)$$

$$B(2x,2y+1) \leftarrow SB2(x,y)$$

$$B(2x+1,2y+1) \leftarrow SB3(x,y)$$

where x and y are integers of 0 to 5.

When the identification information represents that the data have been encoded by either the encoding unit 1300 or 1400, the sub-block integration unit 1504 simply integrates the sub-blocks SB0 to SB8 into a format shown in FIG. 24C, that is, obtains the pixels of the 12×12-pixel block B in accordance with the following formulas, and outputs the 12×12-pixel block B:

$$B(3x,3y) \leftarrow SB0(x,y)$$

$$B(3x+1,3y) \leftarrow SB1(x,y)$$

$$B(3x+2,3y) \leftarrow SB2(x,y)$$

$$B(3x,3y+1) \leftarrow SB3(x,y)$$

$$B(3x+1,3y+1) \leftarrow SB4(x,y)$$

$$B(3x+2,3y+1) \leftarrow SB5(x,y)$$

$$B(3x,3y+2) \leftarrow SB6(x,y)$$

$$B(3x+1,3y+2) \leftarrow SB7(x,y)$$

$$B(3x+2,3y+2) \leftarrow SB8(x,y)$$

where x and y are integers of 0 to 3.

As described above, in addition to the operation effects of the third embodiment, the fourth embodiment can increase the compression efficiency of image data which changes in a cycle of three pixels.

The fourth embodiment may also employ the same arrangements as those of the encoding units 1130 and 1140. That is, it is also possible to distribute a 12×12-pixel block to 3×3 sub-blocks in the horizontal and vertical directions, and further add two encoding units which encode the sub-blocks.

By adding another distribution method in addition to the above-mentioned one, various types of images can be efficiently compressed.

Fifth Embodiment

The fifth embodiment will be explained. The fifth embodiment will exemplify an image encoding apparatus which incorporates the binary image encoding apparatus according to the above-described third embodiment and generates fixed-length encoded data. As is apparent from the following description, the image encoding apparatus according to the second embodiment is also applicable as the binary image encoding apparatus.

Figure 27:
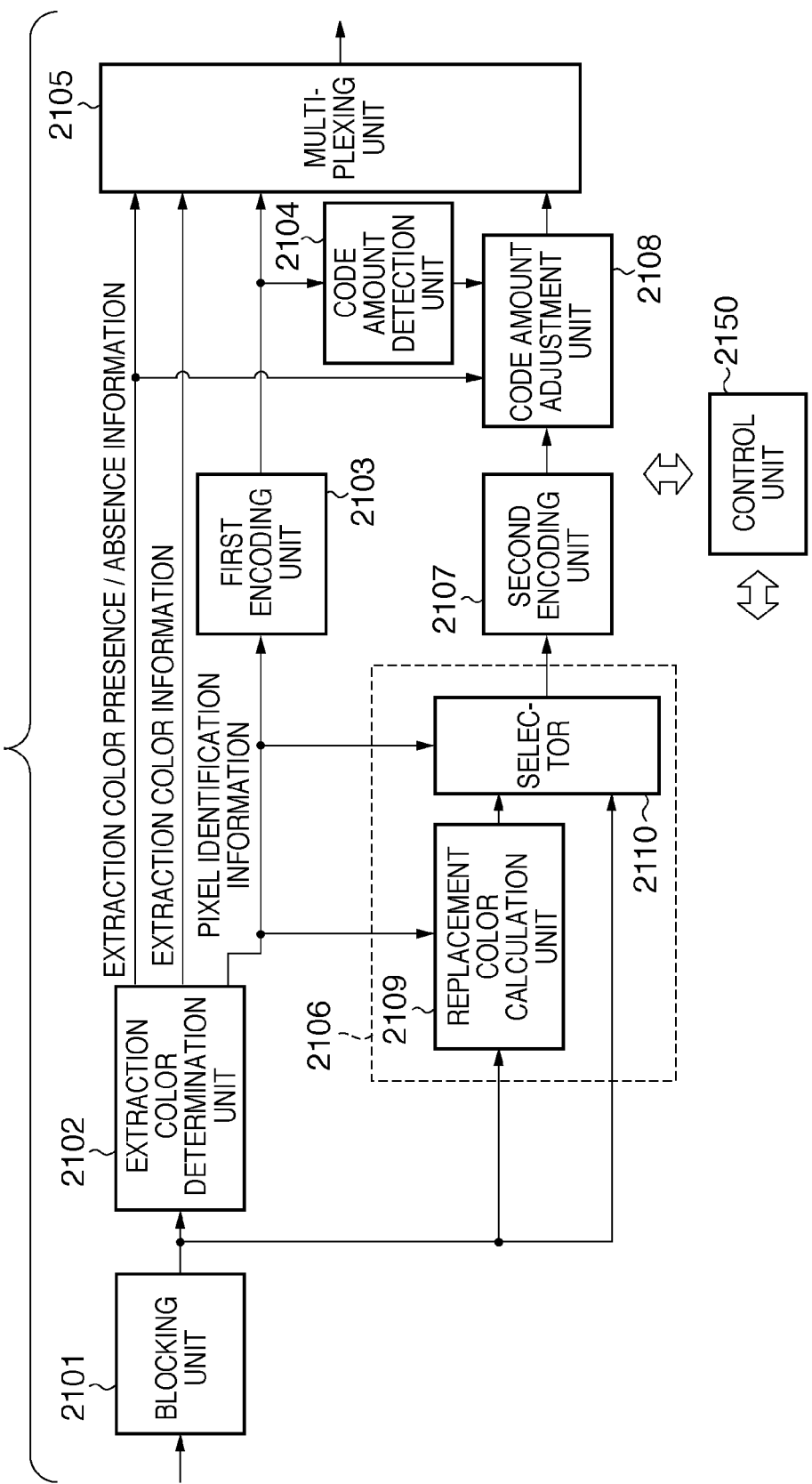
FIG. 27 is a block diagram of the arrangement of an image encoding apparatus in the fifth embodiment.

FIG. 27 is a block diagram of the arrangement of the encoding apparatus in the fifth embodiment. The encoding apparatus comprises a control unit 2150 which controls the overall apparatus, a blocking unit 2101, an extraction color determination unit 2102, a first encoding unit 2103, a code amount detection unit 2104, a multiplexing unit 2105, a replacement unit 2106, a second encoding unit 2107, and a code amount adjustment unit 2108.

In this arrangement, the first encoding unit 2103 has the arrangement (FIG. 10) described in the third embodiment. Since the times taken for processes by the respective processing units are different from each other, buffer memories are arranged on the input stages of the respective processing units to synchronize the processes with each other.

Process contents in the arrangement of FIG. 27 will be explained.

The blocking unit 2101 receives multilevel image data to be encoded for each block (M×N pixels) made up of a plurality of pixels, and outputs it to an output stage. The first encoding unit 2103 in the fifth embodiment has the arrangement in the third embodiment, and M=N=16.

In the fifth embodiment, for descriptive convenience, the pixels of image data to be encoded are formed from R, G, and B components, and each component is represented by eight bits (256 tones). As described above, one block has a size of 16×16 pixels. The blocking unit 2101 outputs block data of the R component, those of the G component, and those of the B component in the order named. However, the type of color component is not limited to RGB, and may also be YMC. In addition, the number of components and that of bits are not limited to the above-mentioned ones.

The extraction color determination unit 2102 determines whether a pixel having a high frequency component exists in image data of 16×16 pixels (=256 tones) in an input block of one color component. The extraction color determination unit 2102 extracts the color of the pixel as an extraction color, and outputs it to the multiplexing unit 2105. The extraction color determination unit 2102 outputs, to a replacement color calculation unit 2109 and the first encoding unit 2103, binary data for discriminating a pixel having the extraction color from a pixel having a non-extraction color. When the binary data is "1", the pixel has the extraction color. When the binary data is "0", the pixel has a non-extraction color. In the fifth embodiment, one block is made up of 16×16 pixels, so the extraction color determination unit 2102 generates 16×16 binary data. The binary data is used to identify which of the extraction color and non-extraction color each pixel in the block has. The binary data will be called pixel identification information.

An example of an algorithm for obtaining an extraction color and pixel identification information in the extraction color determination unit 2102 is as follows.

The average of pixels in a block is calculated. Pixels are classified into a group (to be referred to as a first pixel group hereinafter) of pixels having values larger than the average, and a group (to be referred to as a second pixel group hereinafter) of pixels having values equal to or smaller than the average. Further, the average (first average) of the first pixel group and the average (second average) of the second pixel group are calculated to determine whether the absolute value of the difference between them exceeds a preset threshold.

If the absolute value of the difference between the first and second averages exceeds the threshold, the extraction color determination unit 2102 notifies the multiplexing unit 2105 of extraction color presence/absence information representing that the extraction color exists. The extraction color determination unit 2102 regards the second pixel group as pixels having the extraction color, and outputs the color information as extraction color information to the multiplexing unit 2105. The extraction color determination unit 2102 outputs, to the first encoding unit 2103 and replacement unit 2106, pixel identification information which is "1" at the position of a pixel having the extraction color and "0" at the position of a pixel having a non-extraction color. Note that pieces of pixel identification information are output in the raster scan order.

If the absolute value of the difference between the first and second averages is equal to or smaller than the threshold, the extraction color determination unit 2102 notifies the multiplexing unit 2105 of extraction color presence/absence information representing that no extraction color exists. The extraction color determination unit 2102 outputs position information in which all the bits are "0". The extraction color determination unit 2102 may not output extraction color information. This is because, when the multiplexing unit 2105 receives extraction color presence/absence information representing that no extraction color exists, it ignores extraction color information from the extraction color determination unit 2102.

The process contents in the extraction color determination unit 2102 have been described, but this is merely an example. Although details of the process will become apparent from the following description, the extraction color determination unit 2102 suffices to extract a high frequency component from a block of interest.

The first encoding unit 2103 encodes 16×16 pieces of binary pixel identification information output from the extraction color determination unit 2102, and outputs the encoded data to the multiplexing unit 2105. It is understandable that the encoding process described in the third embodiment is directly applicable because the pixel identification information encoded by the first encoding unit 2103 is 16×16 pieces of information each having a value "0" or "1".

The code amount detection unit 2104 detects the encoded amount of data (the number of bits) of pixel identification information of one block output from the first encoding unit 2103, and outputs the detection result to the code amount adjustment unit 2108. Details of the code amount adjustment unit 2108 will be described later.

The replacement unit 2106 will be explained. The replacement color calculation unit 2109 in the replacement unit 2106 calculates the average of the components of pixels whose pixel identification information is "0" (pixels having a non-extraction color). Then, the replacement unit 2106 outputs the calculated color as replacement color data to a selector 2110. More specifically, letting P(x,y) be the value of a color component at the position of the coordinates (x,y) (x, y=0, 1, . . . , 15) of a block of interest, I(x,y) (=0 or 1) be pixel identification information, and N be the number of pieces of pixel identification information representing "0", an average Ave is given by Ave=ΣΣP(i,j)×(1−I(i,j))/N where ΣΣ is a consolidation function in the possible range (0 to 15) of the variables i and j.

The replacement color calculation unit 2109 outputs the calculated average Ave as replacement color data to the selector 2110. When the number of pieces of pixel identification information representing "0" is 0 in a block of interest, that is, N=0, a proper value can also be output without executing the above-described calculation. This is because, when N=0, the selector 2110 selects 256 pixel data from the blocking unit 2101, and outputs them.

When the pixel identification information is "1", the selector 2110 selects replacement color information Ave output from the replacement color calculation unit 2109. When the pixel identification information is "0", the selector 2110 selects pixel data from the blocking unit 2101, and outputs it.

In short, the replacement unit 2106 in the fifth embodiment replaces, with the average of pixels having a non-extraction color, the value of each component of a pixel determined to have an extraction color, and outputs the resultant value to the second encoding unit 2107. As a result, the image of a 16×16-pixel block output from the replacement unit 2106 is converted into an image having a low spatial frequency.

The second encoding unit 2107 is, for example, a JPEG encoding unit (DCT transformation, quantization, and entropy coding) which is a representative of lossy encoding.

The second encoding unit 2107 distributes image data of 16×16 pixels output from the replacement unit 2106 to four 8×8-pixel sub-blocks. The second encoding unit 2107 performs known DCT transformation, quantization, and entropy coding for each of the four sub-blocks. At this time, one sub-block includes one DC component and 63 AC components. As the data sequence, encoded data of four DC components are output first. Then, the AC components of four sub-blocks are scanned in a zigzag in the ascending order of the frequency and alternately output in order to prevent cutoff of the DC component of each sub-block upon code amount adjustment (to be described later).

The second encoding unit 2107 outputs the generated encoded data (encoded data of the 16×16-pixel block) to the code amount adjustment unit 2108.

The code amount adjustment unit 2108 functions as a means for suppressing the data amount of encoded data of halftone image data output from the second encoding unit 2107 in accordance with the encoded data amount of pixel identification information output from the code amount detection unit 2104. The code amount adjustment unit 2108 adjusts the encoded data amount per block to a fixed length L almost free from degradation of the image quality.

Letting L0 be the maximum encoded data amount generated by the first encoding unit 2103, and L1 be the maximum encoded data amount of four DC components generated by the second encoding unit 2107, the fixed length L in the third embodiment satisfies at least L≧block header length+L0+L1.

When the fixed length L of encoded data of one block is defined as described above, information requiring high resolution, such as a character-line image, can be losslessly encoded. Further, the DC component of a halftone image can be reliably maintained. If all encoded data generated by the second encoding unit 2107 cannot be adjusted to fall within the fixed length L, the encoded data are cut (discarded) at a position corresponding to the fixed length L. Accordingly, the encoded data have the fixed length, and can be decoded from any pixel block.

Figure 28:
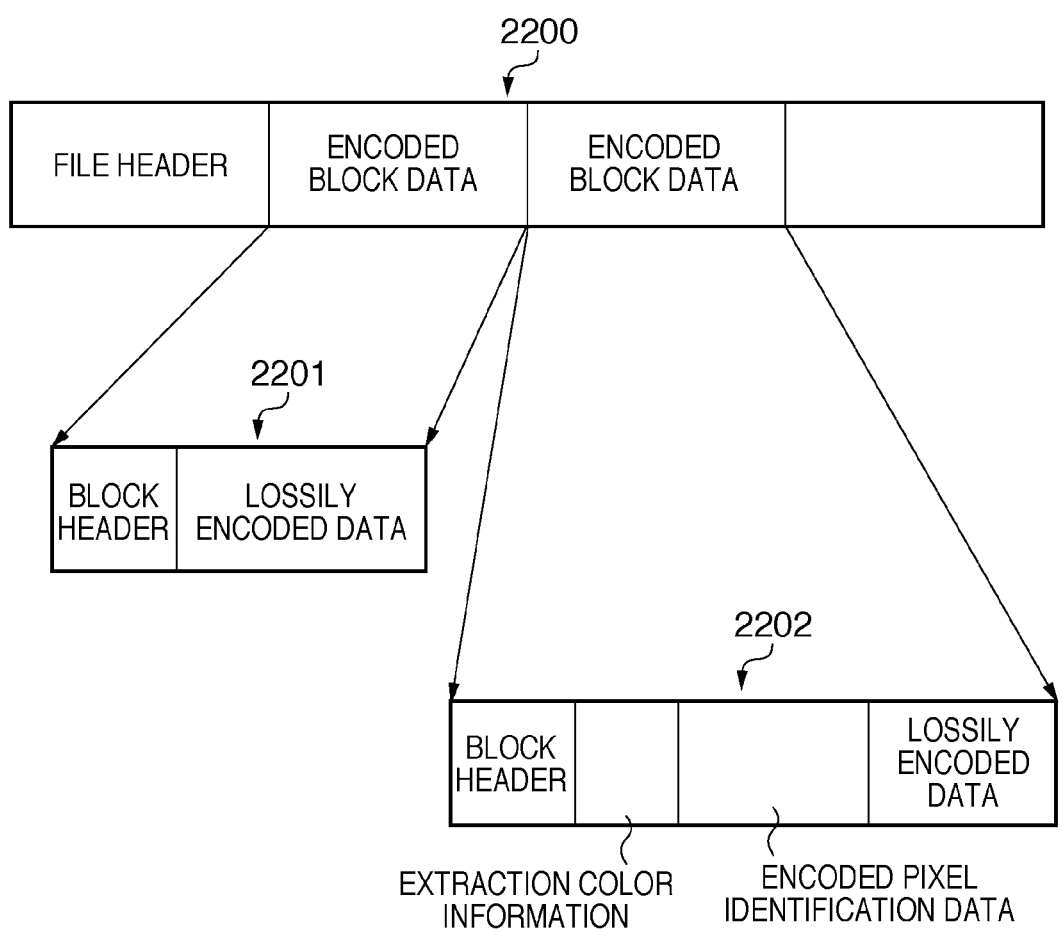
FIG. 28 is a view showing the data format of encoded data of one block according to the fifth embodiment.

FIG. 28 shows the structure of an image data file 2200 formed from encoded data output from the multiplexing unit 2105 of the image encoding apparatus in the fifth embodiment.

Prior to outputting encoded data, the multiplexing unit 2105 generates and outputs a file header. The file header contains information necessary for a decoding process, such as the image size (the numbers of pixels in the horizontal and vertical directions), information which specifies a color space, the number of bits representing each color component, and the data length of encoded data of one block. As shown in FIG. 28, each block has either encoded data 2201 or 2202. The encoded data 2201 represents a data structure having no extraction color, whereas the encoded data 2202 represents a data structure having an extraction color. The data structure of one block having no extraction color is formed from a block header storing information representing that no extraction color exists, and encoded data of a halftone image generated by the second encoding unit 2107. The encoded data 2202 is formed from a block header storing information representing that an extraction color exists, extraction color information, encoded data of pixel identification information, and encoded data of a halftone image. In either case, the encoded data 2201 and 2202 have the same data lengths.

When entropy-decoding lossily encoded data of one block, the apparatus which decodes encoded data in the fifth embodiment regards, as a proper value (e.g., 0), an AC component which have been cut and could not be decoded, and executes a decoding process, restoring a halftone image. As a result of decoding pixel identification information, a pixel value representing the extraction color is set at a pixel position "1".

As described above, according to the fifth embodiment, the present invention is applied to fixed length coding of a block image. Even if identification information is complicated, efficient compression can be achieved. Since the amount of code given to compression of a replaced image increases, the image quality can be improved.

The third to fifth embodiments described above may also be implemented by a computer program which is read and executed by a microprocessor in a computer. In this case, the compute program suffices to be formed by merging functional programs corresponding to the respective processing units shown in FIGS. 10, 11, 23, 26, and 27. In general, the computer program is stored in a computer-readable storage medium such as a CD-ROM. By setting the storage medium in the reader (e.g., CD-ROM drive) of the computer, and copying or installing the computer program in the system, the computer program can be executed. It is, therefore, apparent that the computer-readable storage medium also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-244444 filed on Sep. 20, 2007 and 2007-300972 filed on Nov. 20, 2007, which are hereby incorporated by reference herein in their entirety.

What is claimed is:

1. An image encoding apparatus which compression-encodes image data, the apparatus comprising:
    an input unit which inputs image data for each block having a size of a plurality of pixels in horizontal and vertical directions;
    a generating unit which generates, from a block of interest input from said input unit, p×q sub-blocks (p and q are positive integers, and at least either of p and q is not less than 2) by scanning the block of interest using a window having a size of p×q pixels, where each of the p×q sub-blocks is formed from pixel data at same positions in respective windows;
    an encoding unit which encodes each sub-block generated by said generating unit, generating encoded sub-block data; and
    an output unit which, if total data amount of p×q encoded sub-block data exceeds a predetermined allowable amount, discards at least one encoded sub-block data among p×q encoded sub-block data so that the total data amount falls within the admissible amount, and outputs remaining encoded sub-block data as encoded data of the block of interest.

2. The apparatus according to claim 1, wherein said output unit which, letting $L(0)$ to $L(p \times q-1)$ be data amounts of encoded sub-block data generated by said encoding unit, and Th be the allowable encoded data amount, obtains a maximum integer i that satisfies $$\Sigma L(i) \leq Th$$

and outputs, as encoded data of the block of interest input from said input unit, the number of encoded sub-block data that is represented by i.

3. The apparatus according to claim 1, wherein when the p×q sub-blocks are defined as SB(0), SB(1), ..., SB(p×q−1), said encoding unit encodes the first sub-block SB(0) while maintaining pixel values in the sub-block SB(0), and when encoding a sub-block SB(k) (k is a positive integer) of interest, generates sub-block difference information SB'(k) by calculating a difference between a pixel value at each position in the sub-block SB(k) of interest and a pixel value at relatively an identical position in a preceding sub-block SB(k−j) (j is a positive integer), and encodes a difference value at each pixel position of the generated sub-block difference information SB'(k).

4. The apparatus according to claim 3, wherein an output unit outputs encoded sub-block data of a sub-block SB(0) to sub-block SB(i).

5. A method of controlling an image encoding apparatus which compression-encodes image data, the method comprising:
an input step of inputting image data for each block having a size of a plurality of pixels in horizontal and vertical directions;
a generating step of generating, from a block of interest input in said input step, p×q sub-blocks (p and q are positive integers, and at least either of p and q is not less than 2) by scanning the block of interest using a window having a size of p×q pixels, where each of the p×q sub-blocks is formed from pixel data at same positions in respective windows;
an encoding step of encoding each sub-block generated in the generating step, thereby generating encoded sub-block data; and
an output step of, if total data amount of p×q encoded sub-block data exceeds a predetermined allowable amount, discarding at least one encoded sub-block data among p×q encoded sub-block data so that the total data amount falls within the admissible amount, and outputting remaining encoded sub-block data as encoded data of the block of interest.

6. An image decoding apparatus which decodes encoded data generated by an image encoding apparatus defined in claim 2, the apparatus comprising:
an input unit which inputs encoded data corresponding to the block;
a decoding unit which decodes encoded sub-block data contained in the input encoded data, generating a sub-block;
a determination unit which determines, based on the number of generated sub-blocks, whether an omitted sub-block exists;
an interpolating unit which, when said determination unit determines that an omitted sub-block exists, interpolates each pixel value of the omitted sub-block on the basis of pixel values around an omitted pixel of each sub-block decoded by said decoding unit; and
an integration unit which, when said determination unit determines that no omitted sub-block exists, integrates pixel values at relatively identical positions in sub-blocks obtained by said decoding unit, forming p×q adjacent pixels in a block of interest and restoring an image of the block of interest, and
when said determination unit determines that an omitted sub-block exists, integrates pixel values at relatively identical positions in sub-blocks obtained by said decoding unit and the sub-block generated by said interpolating unit, forming p×q adjacent pixels in the block of interest and restoring the image of the block of interest.

7. An image encoding apparatus which encodes image data, the apparatus comprising:
an input unit which inputs image data for each pixel block having a size of a plurality of pixels;
a plurality of distribution units which distribute each pixel data in the pixel block input from said input unit to one of K sub-blocks SB(0) to SB(K−1) each formed from 1/K (K is an integer of not less than 2) of the number of pixels included in the pixel block, said plurality of distribution units performing distribution in accordance with different algorithms;
a plurality of encoding units which encode image data of the sub-blocks SB(0) to SB(K−1) generated by distribution processes of said distribution units, concatenate encoded data of the sub-blocks, and output the concatenated encoded data as encoded data of the pixel block;
a comparison unit which compares data amounts of the encoded data generated by said respective encoding units, and generates identification information representing an encoding unit which has generated encoded data having a minimum code amount; and
a selection unit which selects the encoded data from said encoding unit specified by the identification information generated by said comparison unit, and outputs the selected encoded data and the identification information.

8. The apparatus according to claim 7, further comprising a logical operation unit which uses one of the sub-blocks SB(0) to SB(K−1) as a reference, and exclusive-ORs pixel data of the reference and pixel data of (K−1) sub-blocks except the reference,
wherein said plurality of encoding units include encoding units which encode sub-blocks before a logical operation by said logical operation unit, and encoding units which encode the sub-block serving as the reference and the (K−1) sub-blocks after the logical operation.

9. The apparatus according to claim 7, wherein
one of said distribution units distributes pixel data in the pixel block by setting, as the sub-blocks SB(0) to SB(K−1), divided regions obtained when K is represented by p×q (p and q are integers of not less than 1, and at least either of p and q is not less than 2), and the pixel block is divided into p in a horizontal direction and q in a vertical direction, and
another one of said distribution units distributes pixel data at coordinates (x,y) in the pixel block to a sub-block represented by a remainder obtained when dividing the x-coordinate by p and a remainder obtained when dividing the y-coordinate by p.

10. The apparatus according to claim 7, further comprising:
a second distribution unit which distributes each pixel data in the pixel block input from said input unit to one of J sub-blocks SB(0) to SB(J−1) each formed from 1/J (J is an integer of not less than 2 and J≠K) of the number of pixels included in the pixel block; and
a second encoding unit which encodes image data of the sub-blocks SB(0) to SB(J−1) generated by said second distribution unit, concatenates encoded data of the sub-blocks, and outputs the concatenated encoded data as encoded data of the pixel block,
wherein said comparison unit generates identification information representing which of said plurality of encoding units and said second encoding unit has generated minimum encoded data among encoded data including the encoded data generated by said second encoding unit, and said selection unit selects the encoded data from one of said plurality of encoding units and said second encoding unit that is specified by the identification information generated by said comparison unit, and outputs the selected encoded data and the identification information.

11. An image encoding apparatus which encodes image data, the apparatus comprising:

an input unit which inputs image data for each pixel block having a size of a plurality of pixels;

a first distribution unit which distributes each pixel data in the pixel block input from said input unit to one of K sub-blocks SB(0) to SB(K−1) each formed from 1/K (K is an integer of not less than 2) of the number of pixels included in the pixel block;

a first encoding unit which encodes image data of the sub-blocks SB(0) to SB(K−1) generated by a distribution process of said first distribution unit, concatenates encoded data of the sub-blocks, and outputs the concatenated encoded data as encoded data of the pixel block;

a second distribution unit which distributes each pixel data in the pixel block input from said input unit to one of J sub-blocks SB(0) to SB(J−1) each formed from 1/J (J is an integer of not less than 2 and J≠K) of the number of pixels included in the pixel block;

a second encoding unit which encodes image data of the sub-blocks SB(0) to SB(J−1) generated by said second distribution unit, concatenates encoded data of the sub-blocks, and outputs the concatenated encoded data as encoded data of the pixel block;

a comparison unit which compares data amounts of the encoded data respectively generated by said first encoding unit and said second encoding unit, and generates identification information representing which of said first encoding unit and said second encoding unit has generated minimum encoded data; and a selection unit which selects the encoded data from either of said first encoding unit and said second encoding unit that is specified by the identification information generated by said comparison unit, and outputs the selected encoded data and the identification information.

12. A method of controlling an image encoding apparatus which encodes image data, the method comprising:

an input step of inputting image data for each pixel block having a size of a plurality of pixels;

a plurality of distribution steps of distributing each pixel data in the pixel block input in the input step to one of K sub-blocks SB(0) to SB(K−1) each formed from 1/K (K is an integer of not less than 2) of the number of pixels included in the pixel block, the plurality of distribution steps performing distribution in accordance with different algorithms;

a plurality of encoding steps of encoding image data of the sub-blocks SB(0) to SB(K−1) generated by distribution processes of the distribution steps, concatenating encoded data of the sub-blocks, and outputting the concatenated encoded data as encoded data of the pixel block;

a comparison step of comparing data amounts of the encoded data generated in the respective encoding steps, and generating identification information representing an encoding step in which minimum encoded data has been generated; and a selection step of selecting the encoded data from the encoding step specified by the identification information generated in the comparison step, and outputting the selected encoded data and the identification information.

* * * * *